United States Patent
Won et al.

(10) Patent No.: US 8,908,126 B2
(45) Date of Patent: Dec. 9, 2014

(54) LIQUID CRYSTAL DISPLAY AND MANUFACTURING METHOD THEREOF

(71) Applicant: Samsung Display Co., Ltd., Yongin-City, Gyeonggi-Do (KR)

(72) Inventors: Sung Hwan Won, Seoul (KR); Young Joon Cho, Suwon-si (KR); Kyung Tae Chae, Hwaseong-si (KR); Nak Cho Choi, Hwaseong-si (KR)

(73) Assignee: Samsung Display Co., Ltd., Gyeonggi-Gu (KR)

(*) Notice: Subject to any disclaimer, the term of this patent is extended or adjusted under 35 U.S.C. 154(b) by 176 days.

(21) Appl. No.: 13/721,773

(22) Filed: Dec. 20, 2012

(65) Prior Publication Data

US 2013/0321734 A1    Dec. 5, 2013

(30) Foreign Application Priority Data

May 30, 2012    (KR) .................. 10-2012-0057458

(51) Int. Cl.
  *G02F 1/1333* (2006.01)
  *G02F 1/1343* (2006.01)
  *G02F 1/1362* (2006.01)
  *G02F 1/1341* (2006.01)

(52) U.S. Cl.
  CPC .... *G02F 1/136286* (2013.01); *G02F 1/133377* (2013.01); *G02F 1/1341* (2013.01); *G02F 2001/136222* (2013.01); *G02F 1/134309* (2013.01); *G02F 1/136209* (2013.01)
  USPC .............. 349/84; 349/139; 349/144; 349/145

(58) Field of Classification Search
  CPC .................... G02F 1/133377; G02F 1/133512; G02F 1/133345; G02F 1/136286; G02F 1/133707; G02F 1/134336; G02F 2001/134345
  USPC ................................... 349/84, 139, 144, 145
  See application file for complete search history.

(56) References Cited

U.S. PATENT DOCUMENTS

| | | | |
|---|---|---|---|
| 7,965,033 B2 * | 6/2011 | Hwang et al. ................. | 313/504 |
| 8,461,582 B2 * | 6/2013 | Kimura ........................... | 257/43 |
| 2011/0181576 A1 | 7/2011 | Pan et al. | |

* cited by examiner

*Primary Examiner* — Mike Qi
(74) *Attorney, Agent, or Firm* — Cantor Colburn LLP

(57) ABSTRACT

A liquid crystal display includes: an insulation substrate; pixel electrodes on the insulation substrate; a voltage auxiliary wiring on the insulation substrate and between adjacent pixel electrodes; a liquid crystal layer positioned in microcavities, where the voltage auxiliary wiring is exposed between adjacent microcavities; and a common electrode which overlaps the liquid crystal layer and the exposed voltage auxiliary wiring.

26 Claims, 24 Drawing Sheets

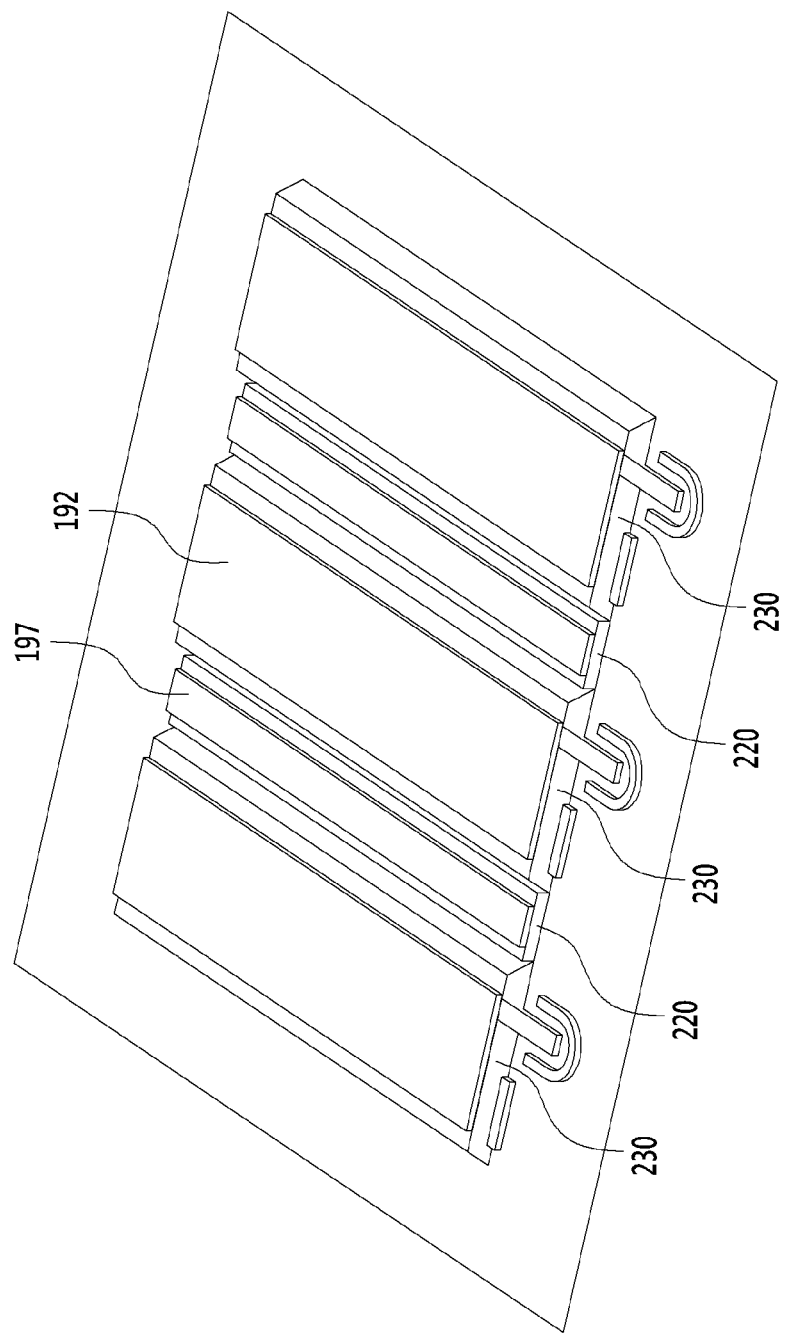

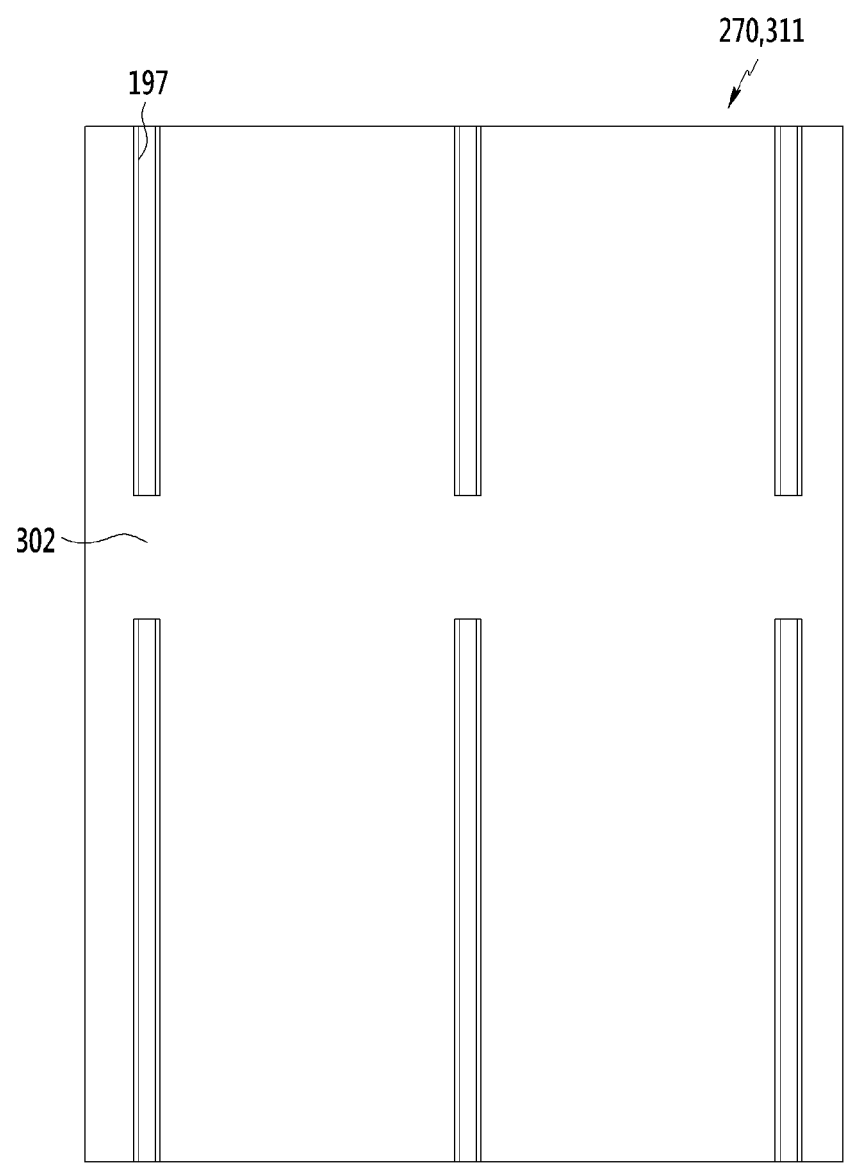

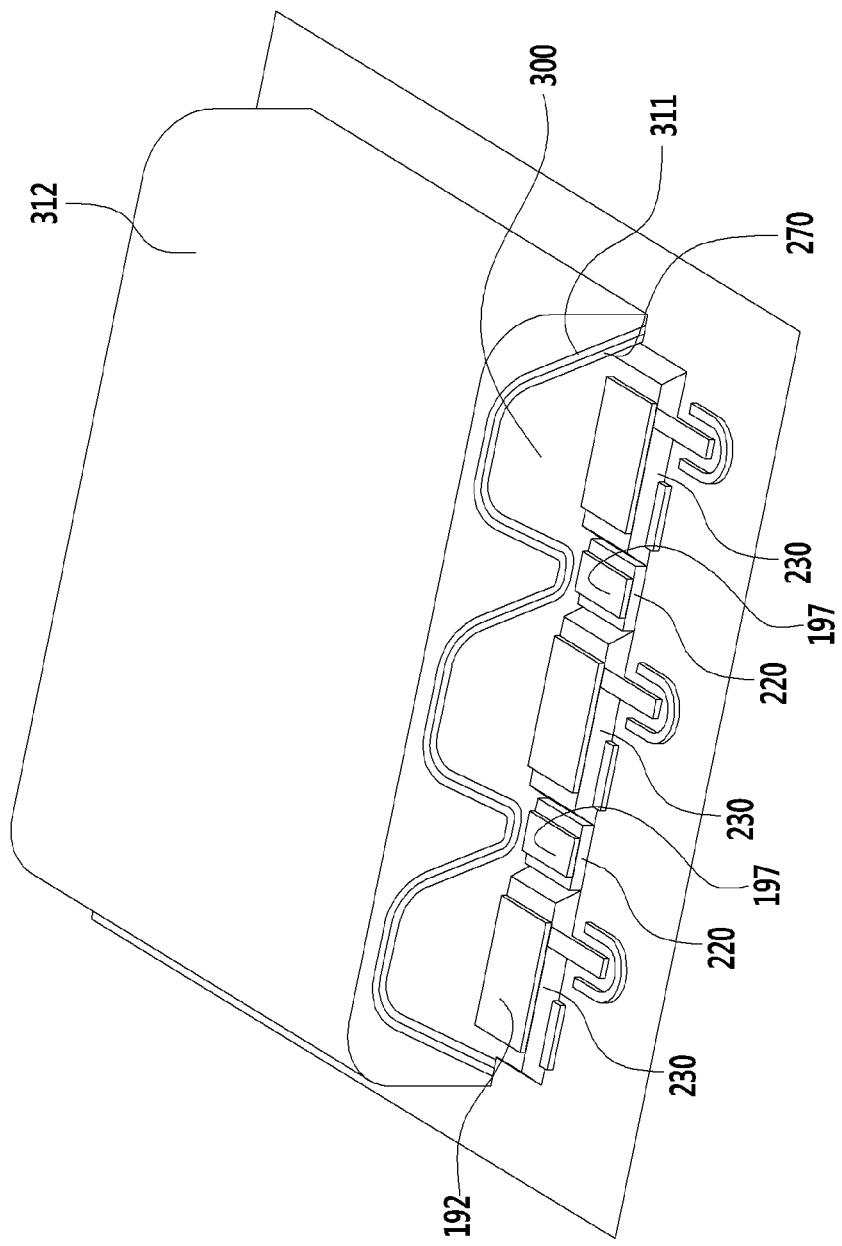

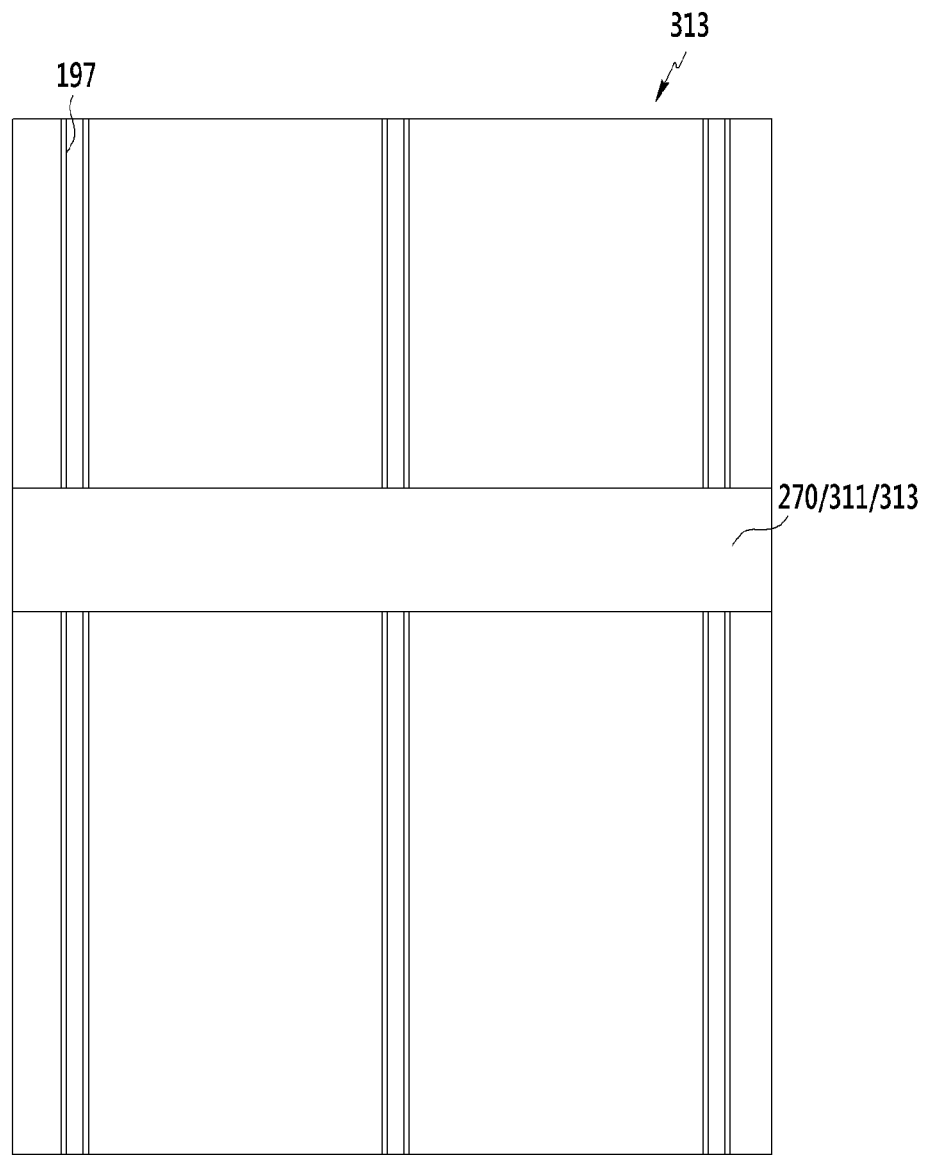

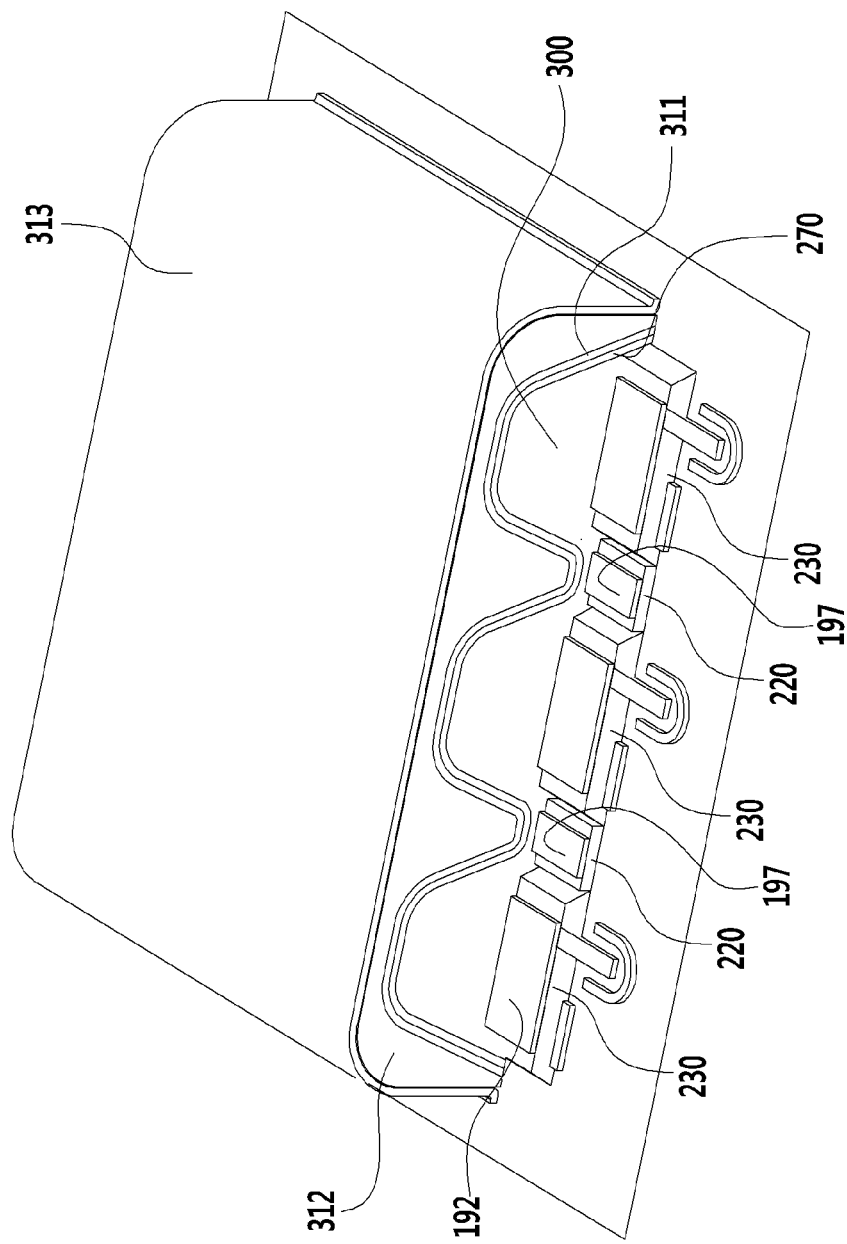

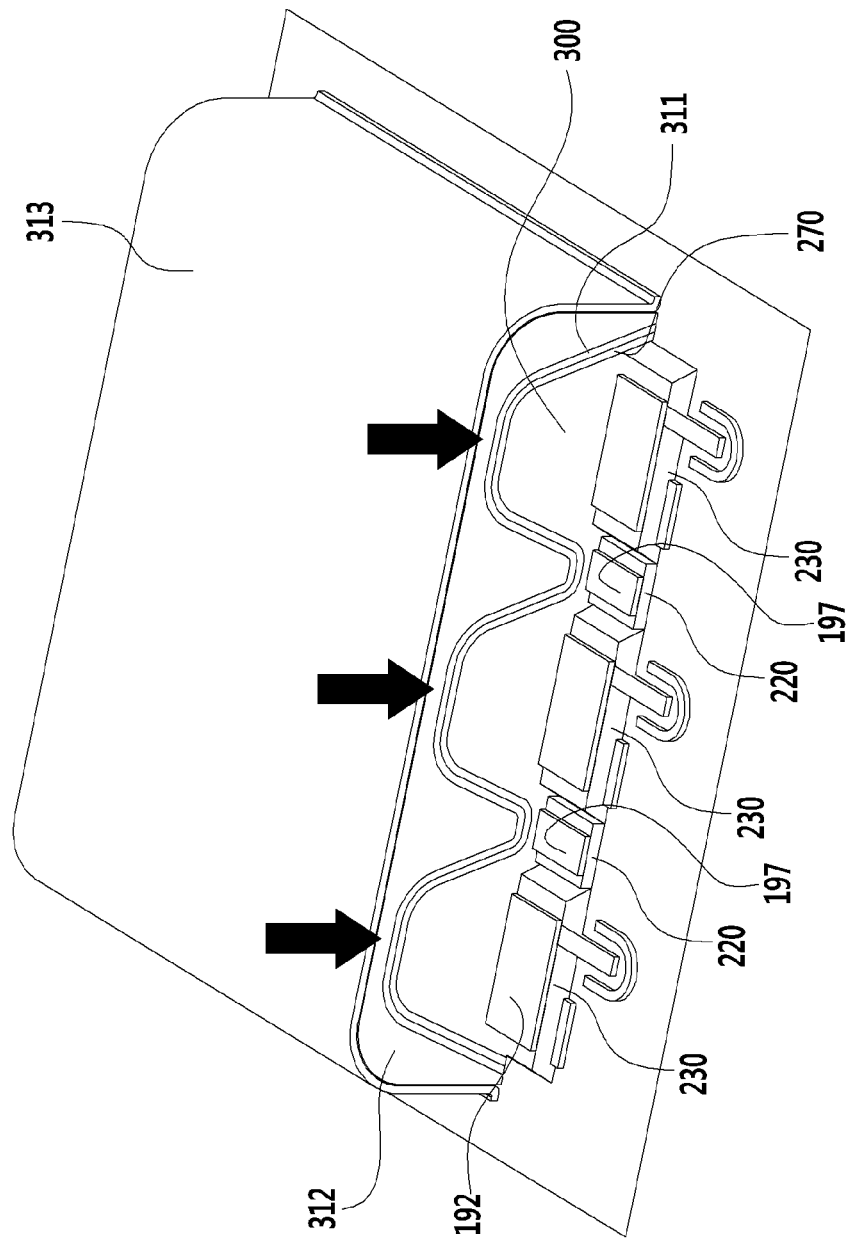

LIQUID CRYSTAL DISPLAY AND MANUFACTURING METHOD THEREOF

This application claims priority to Korean Patent Application No. 10-2012-0057458 filed on May 30, 2012, and all the benefits accruing therefrom under 35 U.S.C. §119, the entire contents of which are incorporated herein by reference.

BACKGROUND (a) Field

The invention relates to a liquid crystal display and a manufacturing method thereof, and more particularly, to a liquid crystal display having a liquid crystal display panel which includes a microcavity and a manufacturing method thereof.

(b) Description of the Related Art

A liquid crystal display which is one of the most common type of flat panel displays, includes two sheets of display panels including field generating electrodes such as a pixel electrode, a common electrode and the like, and a liquid crystal layer interposed between the field generating electrodes.

The liquid crystal display generates an electric field in the liquid crystal layer by applying voltage to the field generating electrodes, and determines the direction of liquid crystal molecules of the liquid crystal layer by the generated electric field, thus controlling polarization of incident light so as to display images.

A liquid crystal display having an embedded microcavity ("EM") structure is a device in which a sacrificial layer is formed in a manufacturing method thereof by a photo resist and a support member is coated on an upper portion thereof, and then the sacrificial layer is removed such as by an ashing process and a liquid crystal is filled in an empty space formed by the removed sacrificial layer, thereby manufacturing a display panel. In order to remove the sacrificial layer, an opening process is performed such as by etching one side of the EM structure and thus a common electrode has a structure connected only in one direction by the process.

As a result, when a common voltage is applied through a portion of the common electrode connected in one direction, a crosstalk occurs due to the common voltage which is changed at another portion of the common electrode (e.g., a center portion) at a distance away from the applied portion.

SUMMARY

One or more exemplary embodiment of the invention provides a liquid crystal display having a constant common voltage without a crosstalk, and a manufacturing method of the liquid crystal display having constant common voltage as a simplified method.

An exemplary embodiment of the invention provides a liquid crystal display, including: an insulation substrate; pixel electrodes on the insulation substrate; a voltage auxiliary wiring on the insulation substrate and between adjacent pixel electrodes; a liquid crystal layer in microcavities, where the voltage auxiliary wiring is exposed between adjacent microcavities; and a common electrode covering the liquid crystal layer and the exposed voltage auxiliary wiring.

The liquid crystal display may further include a plurality of common electrodes, and the plurality of common electrodes may extend in one direction, respectively, and may be disposed in a direction vertical to the one direction with intervals therebetween.

The voltage auxiliary wiring may extend in a direction vertical to the one direction.

The voltage auxiliary wiring may be positioned above a data line.

The voltage auxiliary wiring may have a width smaller than a width of the data line.

The voltage auxiliary wiring and the data line may be separated from each other in a forming region of a thin film transistor.

The voltage auxiliary wiring may have a structure which is bent in one direction in the forming region of the thin film transistor.

The pixel electrodes and the voltage auxiliary wiring may include the same material.

The pixel electrodes may include minute branches.

The liquid crystal display may further include a color filter between the insulation substrate and the pixel electrode.

The liquid crystal display may further include a color filter, where the liquid crystal layer is between the insulation substrate and the color filter.

Another exemplary embodiment of the invention provides a manufacturing method of a liquid crystal display, including: forming a pixel electrode and a voltage auxiliary wiring together on a substrate; forming a sacrificial layer exposing a portion of the voltage auxiliary wiring, on the pixel electrode and the voltage auxiliary wiring; forming a common electrode on the sacrificial layer and electrically connected to the voltage auxiliary wiring; forming a liquid crystal injection hole by removing the sacrificial layer of a liquid crystal injection hole open region; forming a microcavity by removing the sacrificial layer below the common electrode through the liquid crystal injection hole; and injecting a liquid crystal material into the microcavity.

The sacrificial layer may include a main body extended in a vertical direction, and a connection part protruding from the main body.

The connecting part may be positioned above the voltage auxiliary wiring, and a portion thereof may be overlapped with the voltage auxiliary wiring.

The connecting part may be in the liquid crystal injection hole open region and may be etched in the forming a liquid crystal injection hole by removing the sacrificial layer.

In the forming a liquid crystal injection hole, a photo resist may be formed in the liquid crystal injection hole open region, a photo resist pattern may be formed by removing the photo resist of the liquid crystal injection hole open region, and etching may be performed based on the formed photo resist pattern.

The sacrificial layer may include the photo resist.

In the forming a microcavity by removing the sacrificial layer below the common electrode, the sacrificial layer including the photo resist material together with the photo resist pattern, may be wet-etched together.

The manufacturing method of a liquid crystal display may further include forming a lower insulating layer on the common electrode; forming a support layer on the lower insulating layer; and forming an upper insulating layer on the support layer, after the forming a common electrode on the sacrificial layer and before the forming a liquid crystal injection hole by removing the sacrificial layer.

In the forming a common electrode and the forming a lower insulating layer, the common electrode and the lower insulating layer may be formed on an entire of the insulation substrate.

In the forming a support layer, a material for the support layer may be formed on the entire of the insulation substrate, and the material for the support layer formed in the liquid crystal injection hole open region may be removed.

In the forming a liquid crystal injection hole by removing the sacrificial layer of the liquid crystal injection hole open region, a photo resist pattern may be formed on the upper insulating layer to etch the liquid crystal injection hole open region, and in the forming a microcavity by removing the sacrificial layer below the common electrode, the sacrificial layer including the photo resist material together with the photo resist pattern remaining on the upper insulating layer may be wet-etched together.

The manufacturing method of a liquid crystal display may further include forming a color filter between the forming a common electrode and the forming a liquid crystal injection hole, in which the forming of the color filter may be performed by a bake process.

In the forming a microcavity by removing the sacrificial layer, a dry-etching may be performed in order to remove the sacrificial layer.

According to one or more exemplary embodiment of the invention, it is possible to provide a liquid crystal display having constant common voltage so that common voltage is applied in a different direction from an extended direction of the common electrode (that is, a vertical or perpendicular direction thereto). It is further possible to provide a liquid crystal display having constant common voltage without using a separate additional mask by forming a voltage auxiliary wiring together with a pixel electrode, according to one or more exemplary embodiment.

BRIEF DESCRIPTION OF THE DRAWINGS

The above and other features of this disclosure will become more apparent by describing in further detail exemplary embodiments thereof with reference to the accompanying drawings, in which:

FIGS. 3 to 14 are diagrams illustrating an exemplary embodiment of a manufacturing method of the liquid crystal display according to the invention.

DETAILED DESCRIPTION

Figure 1:
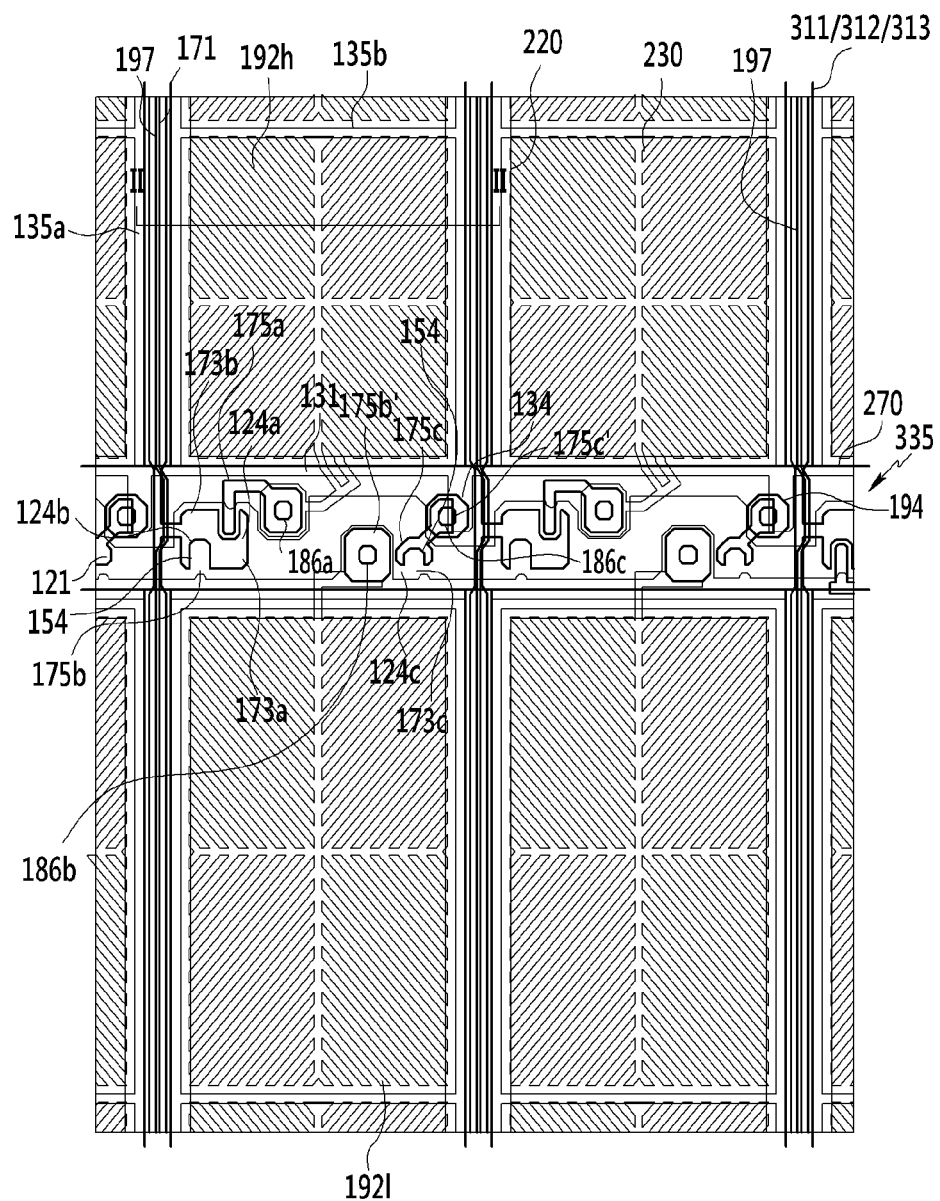
FIG. 1 is a plan view of an exemplary embodiment of a liquid crystal display according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Hereinafter, an exemplary embodiment of a liquid crystal display according to the invention will be described with reference to FIGS. 1 and 2.

Figure 2:
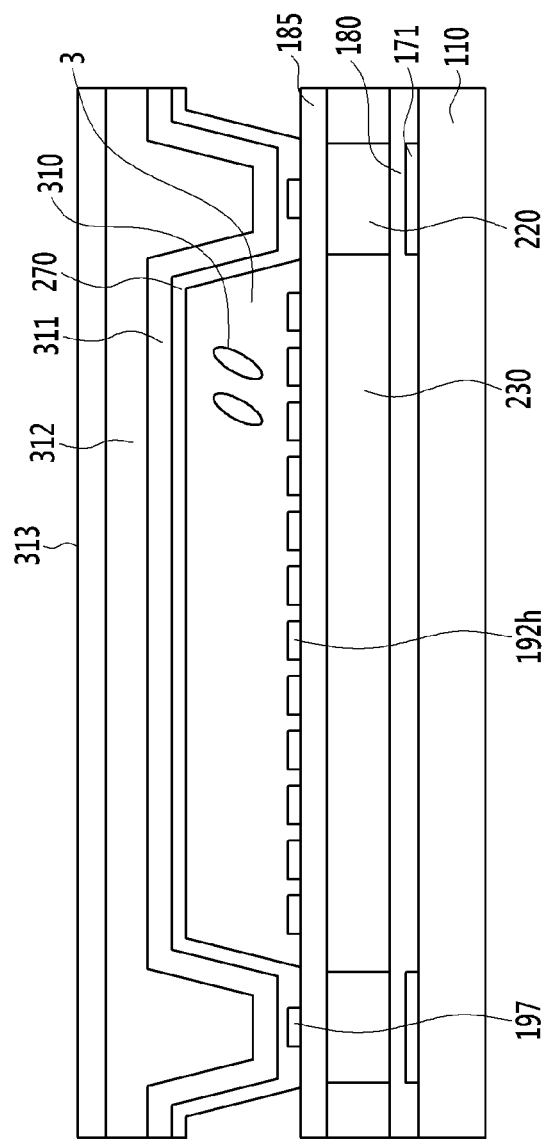
FIG. 2 is a cross-sectional view taken along line II-II of FIG. 1.

FIG. 1 is a plan view of an exemplary embodiment of a liquid crystal display according to the invention, and FIG. 2 is a cross-sectional view taken along line II-II of FIG. 1.

A display panel of the liquid crystal display may include gate line 121 and a storage voltage line 131 are on an insulation substrate 110. The insulation substrate 110 may include transparent glass, plastic or the like, but is not limited thereto or thereby. The liquid crystal display may include a plurality of gate lines 121 and/or a plurality of storage voltage lines 131.

The gate line 121 includes a first gate electrode 124a, a second gate electrode 124b and a third gate electrode 124c. The storage voltage line 131 includes storage electrodes 135a and 135b and a protrusion 134 protruding in a direction towards the gate line 121. The storage electrodes 135a and 135b have a structure surrounding a first subpixel electrode 192h and a second subpixel electrode 192l of a front pixel. In FIG. 1, although the front pixel is not shown, a horizontal portion 135b of the storage electrode may be connected with the horizontal portion 135b of the front pixel by wirings which are not separated from each other.

A gate insulating layer (not shown) is on the gate line 121 and on the storage voltage line 131. A semiconductor 151 (see FIG. 4) positioned below a data line 171, a semiconductor 155 (see FIG. 4) positioned below source and drain electrodes (not shown), and a semiconductor 154 positioned at a channel portion of a thin film transistor are on the gate insulating layer.

A plurality of ohmic contacts may be on each of the semiconductors 151, 154 and 155, and respectively between the data line 171 and the source electrode and the data line and the drain electrode.

A data conductor 171, 173c, 175a, 175b and 175c is on each of the semiconductors 151, 154 and 155 and the gate insulating layer. The data conductor includes a data line 171 including a first source electrode 173a and a second source electrode 173b, a first drain electrode 175a, a second drain electrode 175b, a third source electrode 173c and a third drain electrode 175c.

The first gate electrode 124a, the first source electrode 173a and the first drain electrode 175a form a first thin film transistor together with the semiconductor 154, and a channel of the first thin film transistor is formed at the semiconductor portion 154 between the first source electrode 173a and the first drain electrode 175a. Similarly, the second gate electrode 124b, the second source electrode 173b and the second drain electrode 175b form a second thin film transistor together with the semiconductor 154, and a channel of the second thin film transistor is formed at the semiconductor portion 154 between the second source electrode 173b and the second drain electrode 175b. The third gate electrode 124c, the third source electrode 173c and the third drain electrode 175c form a third thin film transistor together with the semiconductor 154, and a channel of the third thin film transistor is formed at the semiconductor portion 154 between the third source electrode 173c and the third drain electrode 175c.

An exemplary embodiment of the data line 171 has a structure in which a width becomes smaller in a region including the thin film transistor in the vicinity of an extension 175c' of the third drain electrode 175c. The above-described exemplary structure of the data line 171 maintains an interval with the adjacent wiring and reduces signal interference, but is not limited thereto or thereby. The data line 171 has a longitudinal axis and the width is taken perpendicular to the longitudinal axis.

A first passivation layer 180 is on the data conductor 171, 173c, 175a, 175b and 175c and an exposed portion of the semiconductor 154. The first passivation layer 180 may include an inorganic insulator such as silicon nitride (SiNx) and silicon oxide (SiOx), or an organic insulator, but is not limited thereto or thereby.

A color filter 230 and a light blocking member (otherwise referred to as a black matrix) 220 are on the first passivation layer 180.

The light blocking member 220 has a lattice structure in a plan view, the lattice structure having an opening corresponding to a region displaying an image. The light blocking member 220 may include a material through which light is not transmitted. The color filter 230 is in the opening of the light blocking member 220.

The color filter 230 may display one of primary colors such as three primary colors of red, green and blue, but is not limited thereto or thereby. In an alternative exemplary embodiment, the color filter 230 may also display one of cyan, magenta, yellow, white colors, which is not limited to the three primary colors of red, green and blue. The color filter 230 may include a material displaying different color for each adjacent pixel.

A second passivation layer 185 is on the color filter 230 and the light blocking member 220 so as to cover the color filter 230 and the light blocking member 220. The second passivation layer 185 may overlap an entire of the color filter 230 and the light blocking member 220, but is not limited thereto or thereby The second passivation layer 185 may include an inorganic insulator such as silicon nitride (SiNx) and silicon oxide (SiOx), or an organic insulator, but is not limited thereto or thereby. FIG. 2 illustrates no step difference due to a thickness difference between the color filter 230 and the light blocking member 220. Unlike the cross-sectional view of FIG. 2, where an alternative exemplary embodiment includes a step due to a thickness difference between the color filter 230 and the light blocking member 220, the second passivation layer 185 includes the organic insulator, thereby reducing and removing the step.

The color filter 230, the light blocking member 220, and the passivation layers 180 and 185 include a first contact hole 186a and a second contact hole 186b, which expose an extension of the first drain electrode 175a and the expansion 175b' of the second drain electrode 175b. Further, the color filter 230, the light blocking member 220 and the first passivation layer 180 includes a third contact hole 186c which exposes the protrusion 134 of the storage voltage line 131 and the extension 175c' of the third drain electrode 175c.

In the exemplary embodiment, the contact holes 186a, 186b and 186c are in illustrated locations of the light blocking member 220, but the contact holes 186a, 186b and 186c may be in different locations by changing a position of the light blocking member 220 and etching only the color filter 230 and the passivation layers 180 and 185 according to an alternative exemplary embodiment. This change in location and/or position considers that the etching may be difficult according to a material used as the light blocking member 220.

A pixel electrode 192 including the first subpixel electrode 192h and the second subpixel electrode 192l and a voltage auxiliary wiring 197 are on the second passivation layer 185. The pixel electrode 192 and the voltage auxiliary wiring 197 may be in and/or on a same layer of the liquid crystal display panel, but is not limited thereto or thereby. The pixel electrode 192 and the voltage auxiliary wiring 197 may include a transparent conductive material such as indium tin oxide ("ITO") or indium zinc oxide ("IZO").

The first subpixel electrode 192*h* and the second subpixel electrode 192*l* are adjacent to each other in a column (e.g., vertical) direction in the plan view of FIG. 1, have an overall quadrangular shape, and include a cross stem including a horizontal stem and a vertical stem crossing the horizontal stem. Further, the first subpixel electrode 192*h* and the second subpixel electrode 192*l* are divided into four subregions by the horizontal stem and the vertical stem, and each subregion includes a plurality of minute branches.

The minute branches of the first subpixel electrode 192*h* and the second subpixel electrode 192*l* form angles of about 40 degrees to 45 degrees with the gate line 121 or the horizontal stem. Further, the minute branches of two adjacent subregions may be perpendicular to each other. A minute branch has a longitudinal axis and a width is taken perpendicular to the longitudinal axis. Further, a width of the minute branch may gradually increase in a direction and/or intervals between the minute branches 194 may be different from each other.

The first subpixel electrode 192*h* and the second subpixel electrode 192*l* are physically and electrically connected with the first drain electrode 175*a* and the second drain electrode 175*b* through the contact holes 186*a* and 186*b*, respectively, and receive data voltages from the first drain electrode 175*a* and the second drain electrode 175*b*.

A connecting member 194 electrically connects the extension 175*c*' of the third drain electrode 175*c* and the protrusion 134 of the storage voltage line 131 through the third contact hole 186*c*. As a result, some of the data voltages applied to the second drain electrode 175*b* are divided through the third source electrode 173*c* and thus a magnitude of voltage applied to the second subpixel electrode 192*l* may be smaller than a magnitude of voltage applied to the first subpixel electrode 192*h*.

Here, a planar area of the second subpixel electrode 192*l* may be about equal to or greater than and about equal to or less than a planar area of the first subpixel electrode 192*h*.

The voltage auxiliary wiring 197 is disposed above the data line 171 in the cross-sectional view, and has a structure extending in a vertical direction along the data line 171 in the plan view. However, in the exemplary embodiment, the voltage auxiliary wiring 197 has a structure which extends along a first path, is bent towards the right in the plan view, and then returns to the first path in a region of the thin film transistors in the vicinity of the third contact hole 186*c*. Accordingly, since the voltage auxiliary wiring 197 is bent in the region of the thin film transistors, the voltage auxiliary wiring 197 does not overlap the data line 171 in the region of the thin film transistors. However, even though the bent structure of the voltage auxiliary wiring 197 is a structure applied to the exemplary embodiment in order that the pixel structure maintains a regular interval, the structure of the voltage auxiliary wiring 197 is not necessarily required to have the bent structure.

The voltage auxiliary wiring 197 has a longitudinal axis and a width is taken perpendicular to the longitudinal axis. Further, the voltage auxiliary wiring 197 may have a smaller width than the data line 171. Since the voltage auxiliary wiring 197 is positioned above the data line 171, the voltage auxiliary wiring 197 may serve to block a change in an electric field generated when the data voltage is applied to the data line 171.

The common voltage is applied to the voltage auxiliary wiring 197. The voltage auxiliary wiring 197 may have a structure which receives the common voltage from above or below the display panel.

The second passivation layer 185 may include an opening which collects gas discharged from the color filter 230. An overcoat layer which covers the corresponding opening of the second passivation layer 185 with the same material as the pixel electrode 192 may be on the second passivation layer 185. The opening of the second passivation layer 185 and the overcoat are structures for blocking transfer of the gas discharged from the color filter 230 to another element of the display panel. In an alternative exemplary embodiment, the opening of the second passivation layer 185 and/or the overcoat may be omitted.

A common electrode 270 is positioned on the second passivation layer 185, the pixel electrode 192 and voltage auxiliary wiring 197. The common electrode 270 may include a transparent conductive material such as ITO or IZO, and generates an electric field together with the pixel electrode 192 to control an alignment direction of liquid crystal molecules 310 of a liquid crystal layer 3. The display panel may include a plurality of common electrodes 270.

Further, the common electrode 270 is electrically connected with the voltage auxiliary wiring 197 to transmit and receive the common voltage. As a result, the common voltages applied to the common electrode 270 do not have different values but have substantially constant values at various positions of the common electrode 270.

A plurality of common electrodes 270 has a longitudinal axis which extends in one direction (for example, a direction parallel to the gate line 121 in the exemplary embodiment) and is not connected to each other in a direction vertical thereto (for example, a direction parallel to the data line 171 in the exemplary embodiment). However, the voltage auxiliary wiring 197 has the longitudinal axis which extends in the direction parallel to the data line 171 to apply the common voltage at one or more locations along the direction parallel to the data line 171, and thus a substantially constant common voltage is applied to the common electrode 270 over an entire area of the display panel.

A lower insulating layer 311 is disposed on the common electrode 270. A cross section of the lower insulating layer 311 according to the exemplary embodiment may have a trapezoid shape, and may have a liquid crystal injection hole (see also 355 of FIG. 12A) on one side thereof in order to inject a liquid crystal in the microcavity 305 (see FIG. 13). The lower insulating layer 311 may include an inorganic insulating material such as silicon nitride (SiNx), but is not limited thereto or thereby. The liquid crystal injection hole 335 may be used in a method of manufacturing the display panel, even when a sacrificial layer for forming the microcavity 305 is removed. This will be described in detail while describing an exemplary embodiment of a manufacturing method.

Further, in order to arrange the liquid crystal molecules 310 injected in the microcavity 305, an alignment layer (not shown) may be below the common electrode 270 and/or above the pixel electrode 192. The alignment layer may include at least one material such as polyamic acid, polysiloxane or polyimide, but is not limited thereto or thereby.

The liquid crystal layer 3 is formed in the microcavity 305, for example, between the alignment layers. The liquid crystal molecules 301 are initially aligned by the alignment layer, and the alignment direction is changed according to the applied electric field. A thickness of the liquid crystal layer 3 may be about 5 microns (μm) to about 6 μm. In an exemplary embodiment, the liquid crystal layer 3 in the microcavity 305 may be injected in the microcavity 305 by using a capillary force, and the alignment layer may be formed by the capillary force.

A support layer 312 is on the lower insulating layer 311. The support layer 312, as a layer removing a step generated by the microcavity 305 and the liquid crystal layer 3, may include an organic material. The support layer 312 serves to support the common electrode 270 so that an inner portion of the support layer 312, that is, a space (hereinafter, referred to as a microcavity) between the pixel electrode 192 and the common electrode 270 may be maintained An upper insulating layer 313 is on the support layer 312. The upper insulating layer 313 may include an inorganic insulating material such as silicon nitride (SiNx), but is not limited thereto or thereby. In an exemplary embodiment, the support layer 312 and the upper insulating layer 313 may be patterned together with the lower insulating layer 311 to form the liquid crystal injection hole 335. As used herein, "together" may indicate at substantially a same time and/or by a substantially same process.

The lower insulating layer 311 or the upper insulating layer 313 may be omitted according to an exemplary embodiment.

A polarizer (not shown) is positioned below the insulation substrate 110 and above the upper insulating layer 313 in the cross-sectional view. The polarizer includes a polarization element generating polarization and a tri-acetyl-cellulose ("TAC") layer for ensuring durability. Directions of transmissive axes in an upper polarizer and a lower polarizer may be vertical (e.g., perpendicular) or parallel to each other according to an exemplary embodiment.

Hereinafter, an exemplary embodiment of a manufacturing method of a liquid crystal display according to the invention will be described with reference to FIGS. 3 to 14.

Figure 3:
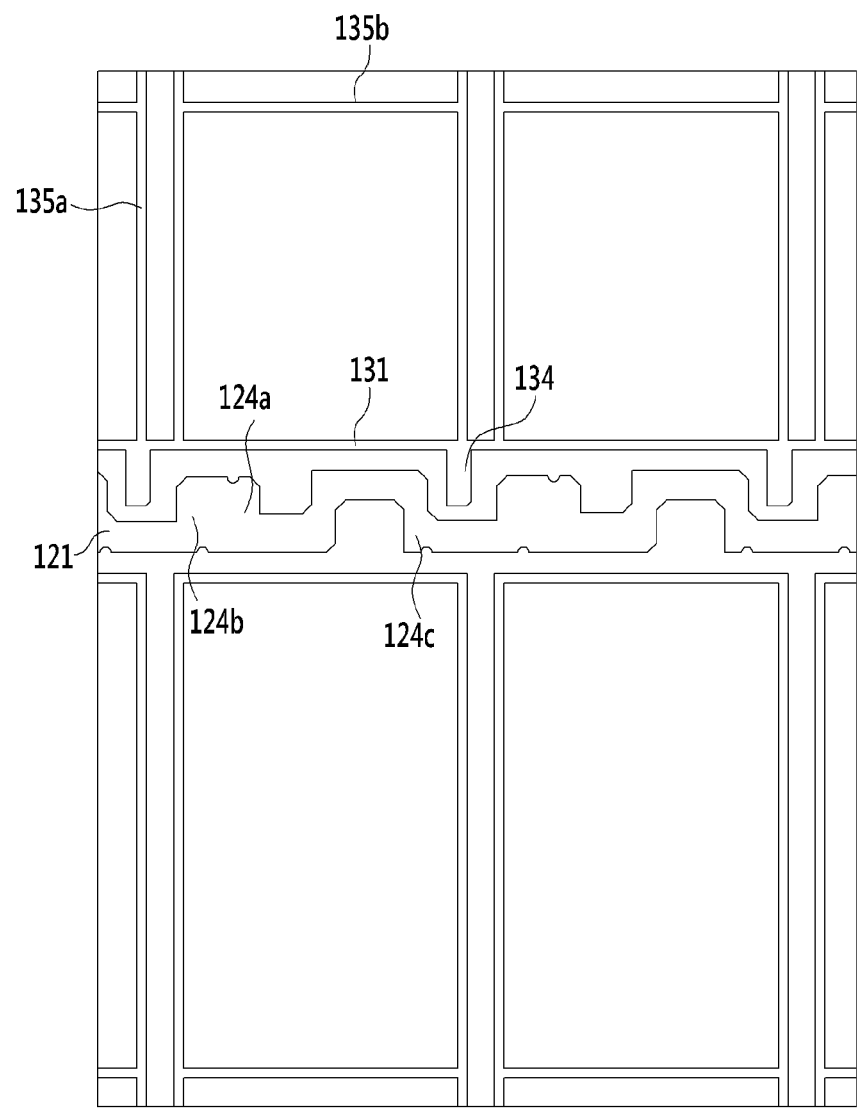

FIGS. 3 to 14 are diagrams illustrating an exemplary embodiment of a manufacturing method of the liquid crystal display according to the invention. First, FIG. 3 is a plan view of a display panel in which a gate line 121 and a storage voltage line 131 are formed on an insulation substrate 110.

Referring to FIG. 3, the gate line 121 and the storage voltage line 131 are formed on the insulation substrate 110. The insulation substrate 110 may include transparent glass, plastic or the like. The gate line 121 and the storage voltage line 131 are formed of a same material by a same mask, and may be formed at substantially a same time and/or in a same layer of the display panel. Further, the gate line 121 includes a first gate electrode 124a, a second gate electrode 124b and a third gate electrode 124c. The storage voltage line 131 includes storage electrodes 135a and 135b, and a protrusion 134 protruding from a main portion of the storage voltage line 131 and in a direction of the gate line 121.

The storage electrodes 135a and 135b have a structure surrounding a first subpixel electrode 192h and a second subpixel electrode 192l of a front pixel. Since gate voltage is applied to the gate line 121 and storage voltage is applied to the storage voltage line 131, the gate line 121 and the storage voltage line 131 are separated from each other. The storage voltage may have a predetermined voltage level or have a swing voltage level, but is not limited thereto or thereby.

A gate insulating layer (not shown) is formed on the gate line 121 and the storage voltage line 131.

Figure 4:
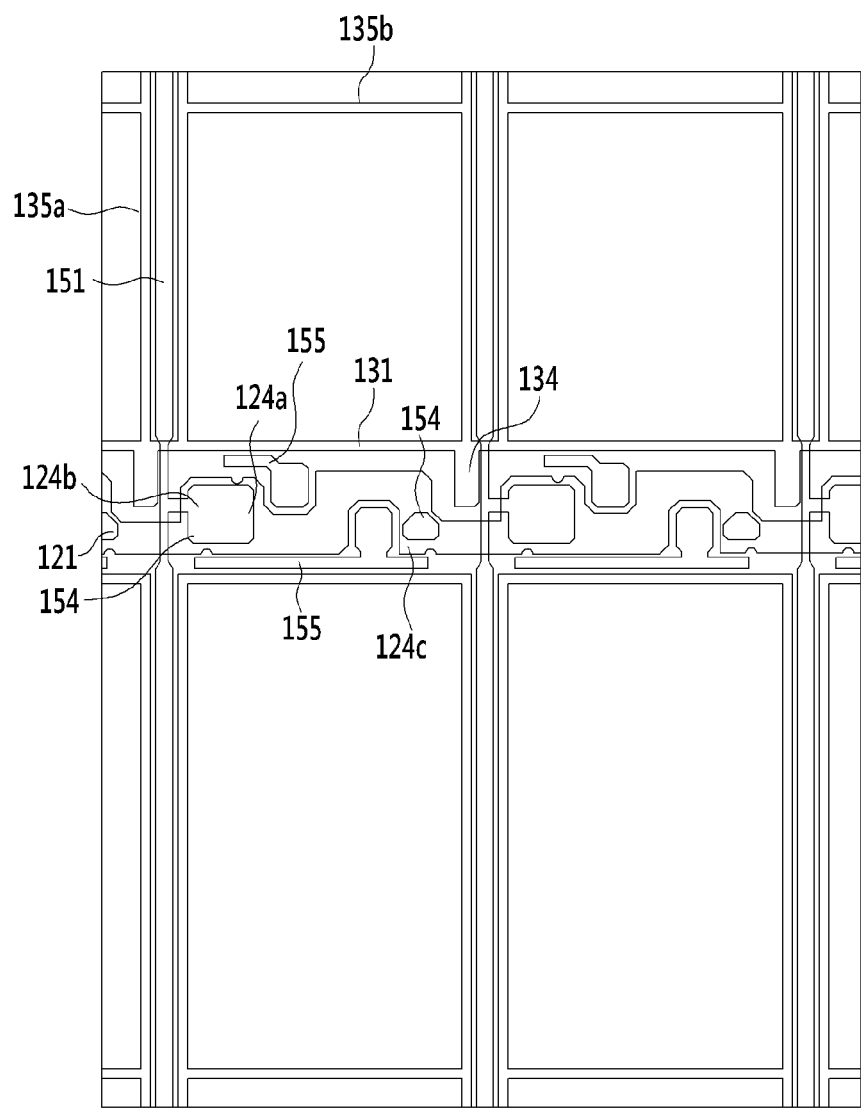
Figure 5:
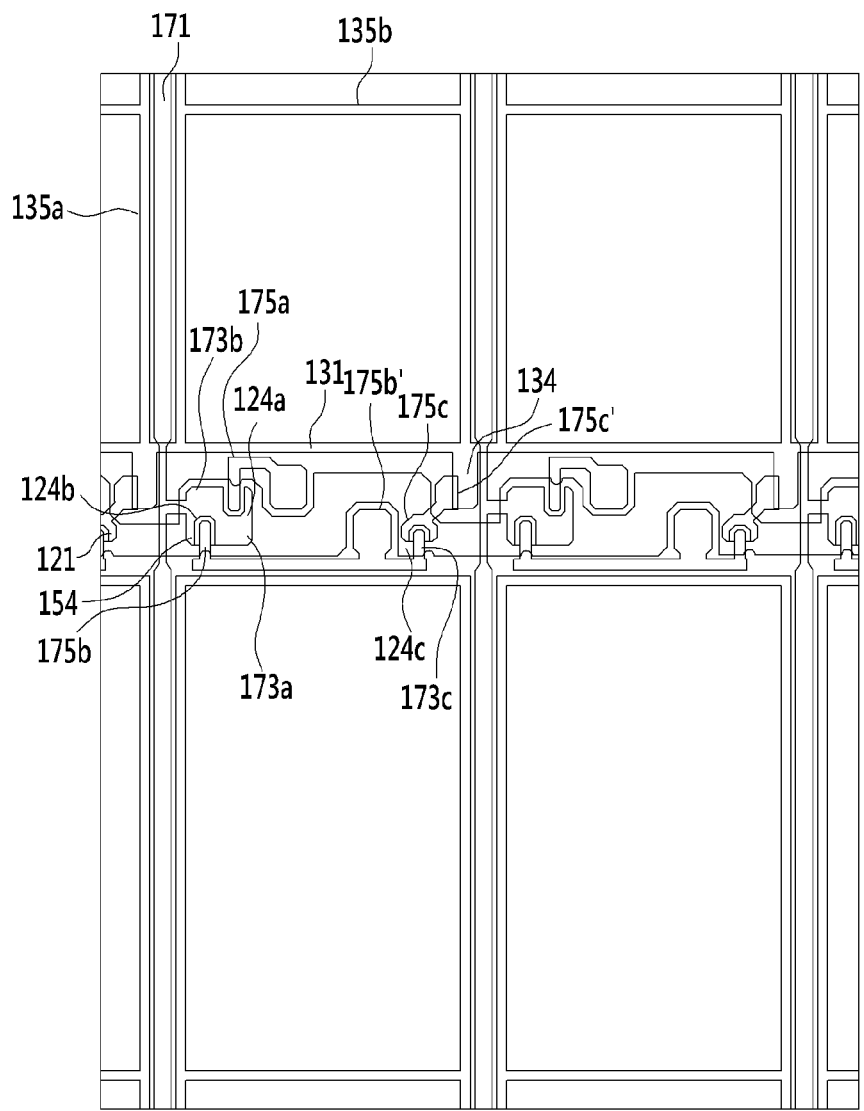

Thereafter, as shown in FIGS. 4 and 5, semiconductors 151, 154, and 155, a data line 171, and source and drain electrodes 173a, 173b, 173c, 175a, 175b and 175c are formed on the gate insulating layer. A planar shape of the semiconductor 151 may be substantially the same as the data line 171, but is not limited thereto or thereby.

FIG. 4 shows a plan view in which the semiconductors 151, 154, and 155 are formed, and FIG. 5 separately shows a plan view in which the source and drain electrodes 173a, 173b, 173c, 175a, 175b, and 175c are formed. However, the semiconductors 151, 154, and 155, the data line 171, and the source and drain electrodes 173a, 173b, 173c, 175a, 175b and 175c are formed together by the following process.

That is, a material of the semiconductors and materials of the source and drain electrodes are sequentially laminated. Thereafter, two patterns are formed together from the materials by one process of exposing, developing and etching through one mask (for example, a slit mask or a transflective mask). In this case, a slit or transflective region of the mask is exposed to correspond to the corresponding portion so that the semiconductor 154 positioned at the channel portion of a thin film transistor is not etched.

A plurality of ohmic contacts may be formed on each of the semiconductors 151, 154 and 155, and between the data line 171 and the source and drain electrodes.

A first passivation layer 180 is formed on the data conductor 171, 173c, 175a, 175b and 175c and on an exposed portion of the semiconductor 154. The first passivation layer 180 may be formed over an entire of the insulation substrate 110, but is not limited thereto or thereby. The first passivation layer 180 may include an inorganic insulator such as silicon nitride (SiNx) and silicon oxide (SiOx), or an organic insulator.

Figure 6:
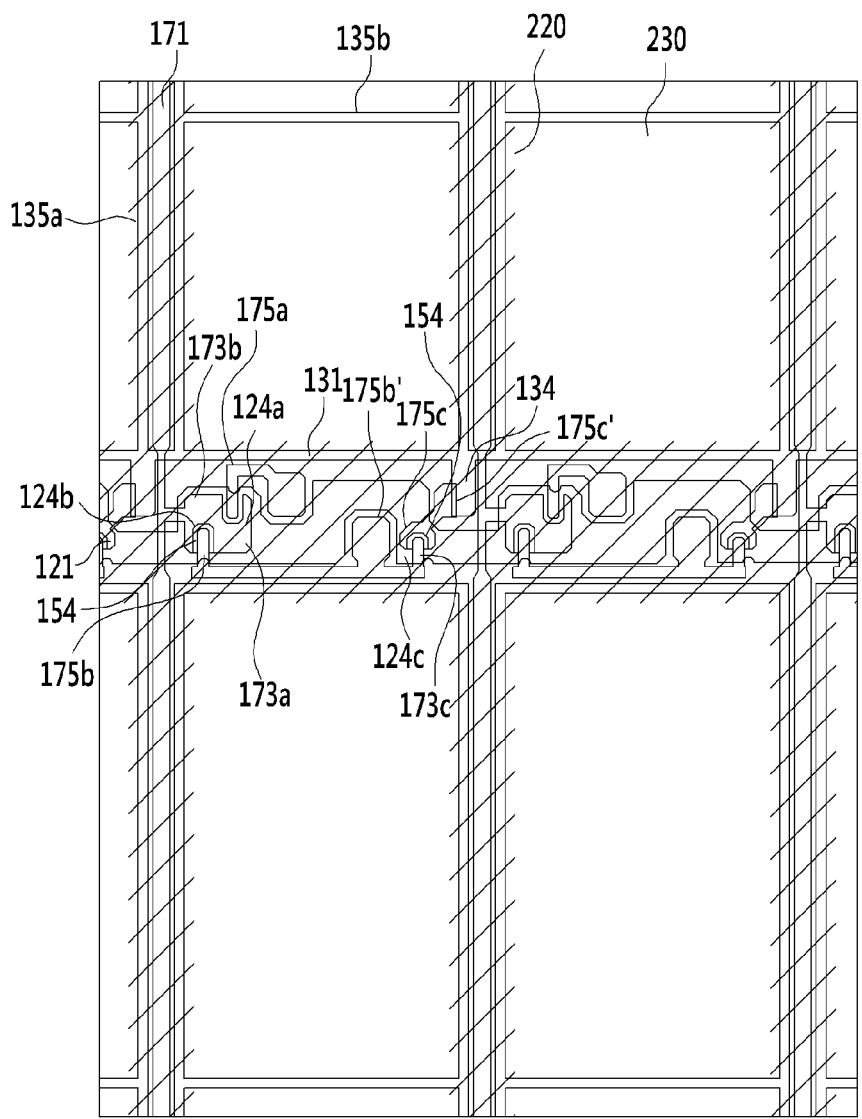

Thereafter, as shown in FIG. 6, color filters 230 and a light blocking member (otherwise referred to as a black matrix) 220 are formed on the first passivation layer 180. The light blocking member 220 is formed in a lattice structure having an opening corresponding to a region displaying an image. The light blocking member 220 includes a material through which light is not transmitted. In FIG. 6, the light blocking member 220 is represented by an oblique line pattern.

The color filters 230 are formed in the opening of the light blocking member 220. The color filters 230 may display one of primary colors such as three primary colors of red, green and blue, and thus a forming process for each color filter 230 may need to be performed. In one exemplary embodiment, for example, in the case of displaying three colors, the forming process of the color filter 230 is performed three times.

A second passivation layer 185 is formed on the color filter 230 and the light blocking member 220. The second passivation layer 185 may be formed over an entire of the insulation substrate 110, but is not limited thereto or thereby. The second passivation layer 185 may include an inorganic insulator such as silicon nitride (SiNx) and silicon oxide (SiOx), or an organic insulator.

Figure 7A:
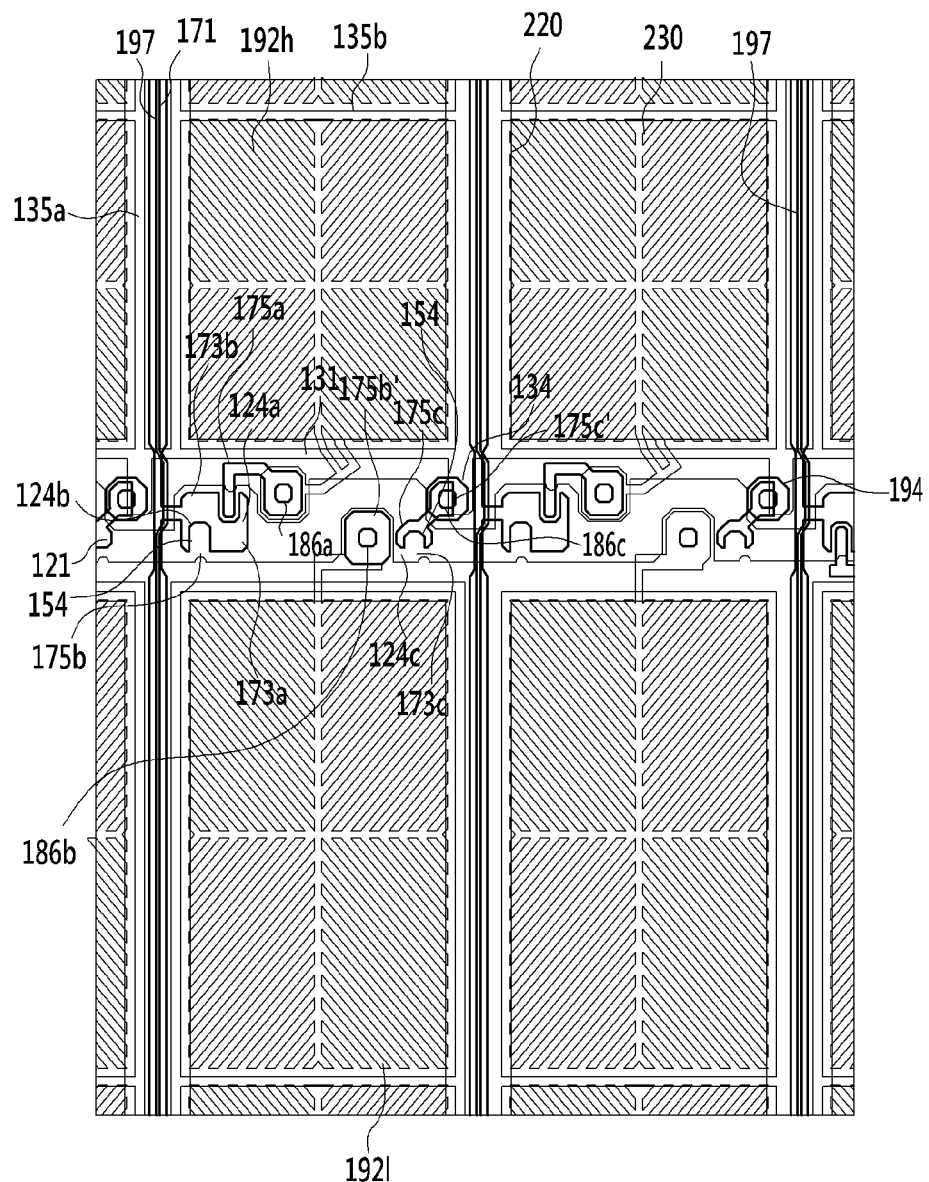

Referring to FIG. 7A, a first contact hole 186a and a second contact hole 186b, which expose an extension of the first drain electrode 175a and the expansion 175b' of the second drain electrode 175b, respectively, are formed in the color filter 230, the light blocking member 220, and the passivation layers 180 and 185. Further, a third contact hole 186c which exposes the protrusion 134 of the storage voltage line 131 and the extension 175c' of the third drain electrode 175c is formed in the color filter 230, the light blocking member 220, and the passivation layers 180 and 185.

Thereafter, a pixel electrode 192 including a first subpixel electrode 192h and a second subpixel electrode 192l, and a voltage auxiliary wiring 197, are formed on the second passivation layer 185. In this case, the pixel electrode 192 and the voltage auxiliary wiring 197 may include a transparent conductive material such as ITO or IZO. Further, the first subpixel electrode 192h and the second subpixel electrode 192l are physically, electrically connected with the first drain electrode 175a and the second drain electrode 175b through the contact holes 186a and 186b, respectively.

Further, a connecting member 194 which electrically connects the extension 175c' of the third drain electrode 175c and the protrusion 134 of the storage voltage line 131 through the third contact hole 186c, is also formed. As a result, some of the data voltages applied to the second drain electrode 175b are divided through the third source electrode 173c and thus a magnitude of voltage applied to the second subpixel electrode 192l may be smaller than a magnitude of voltage applied to the first subpixel electrode 192h. The connecting member 194, the voltage auxiliary wiring 197 and the pixel electrode 192 may be in and/or on a same layer as the display panel.

The voltage auxiliary wiring 197 is disposed above the data line 171 and has a structure extending in a vertical direction in the plan view, along the data line 171. However, in the exemplary embodiment, the voltage auxiliary wiring 197 has a structure which extends along a first path, is bent to the right in the plan view, and then returns to the first path in a region of the thin film transistors in the vicinity of the third contact hole 186c. The exemplary embodiment of the voltage auxiliary wiring 197 includes the bent structure in order that the pixel structure maintains a regular interval, but is not limited thereto or thereby. Further, the voltage auxiliary wiring 197 may have a width smaller than the data line 171. Since the voltage auxiliary wiring 197 is positioned above the data line 171, the voltage auxiliary wiring 197 may serve to block a change in an electric field generated when the data voltage is applied to the data line 171.

The common voltage is applied to the voltage auxiliary wiring 197, and the voltage auxiliary wiring 197 may have a structure which receives the common voltage from above or below the display panel.

FIG. 7B is a perspective view corresponding to the plan view of FIG. 7A, and shows three adjacent pixels. Since FIG. 7B briefly shows a portion viewed from the top of FIG. 7A, only the color filter 230, the light blocking member 220, the pixel electrode 192 and the voltage auxiliary wiring 197 are represented by reference numerals.

As shown in FIG. 7B, the pixel electrode 192 is formed above the color filter 230, and the voltage auxiliary wiring 197 is formed above the light blocking member 220. An edge portion of the pixel electrode 192 may overlap the light blocking member 220 in the plan view.

Figure 8A:
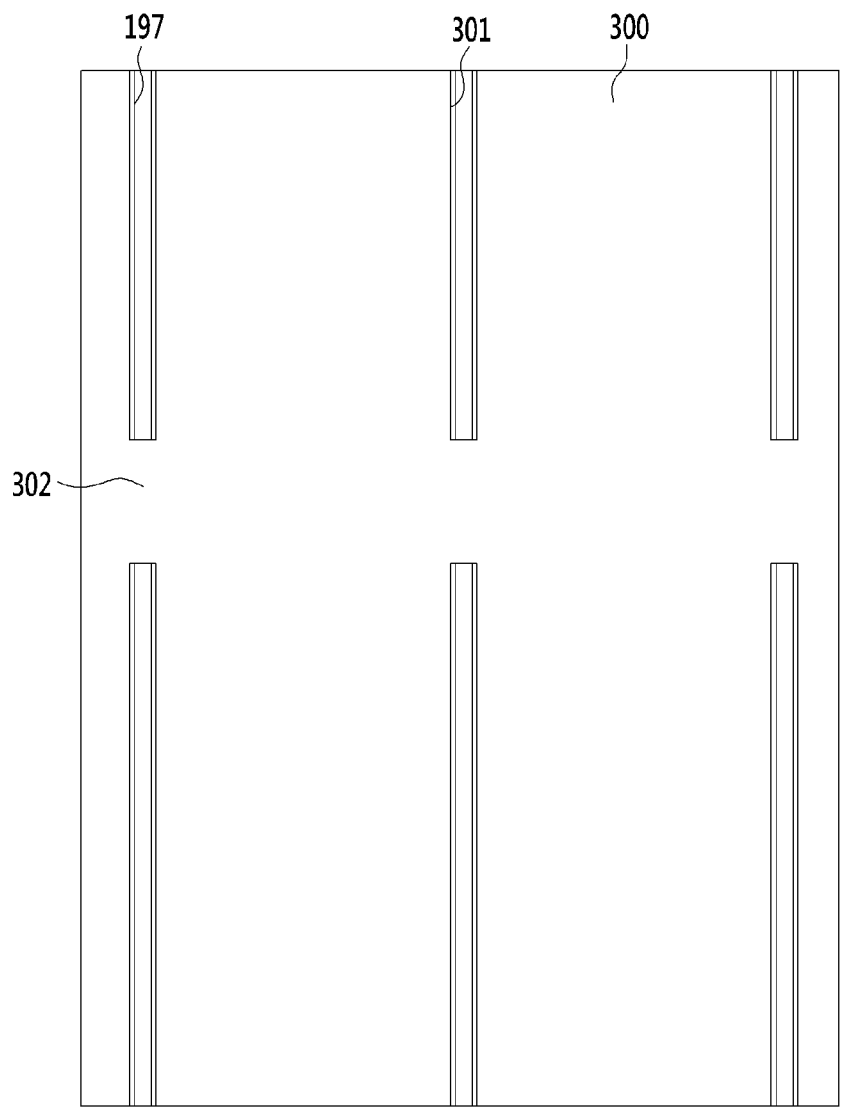
Figure 8B:
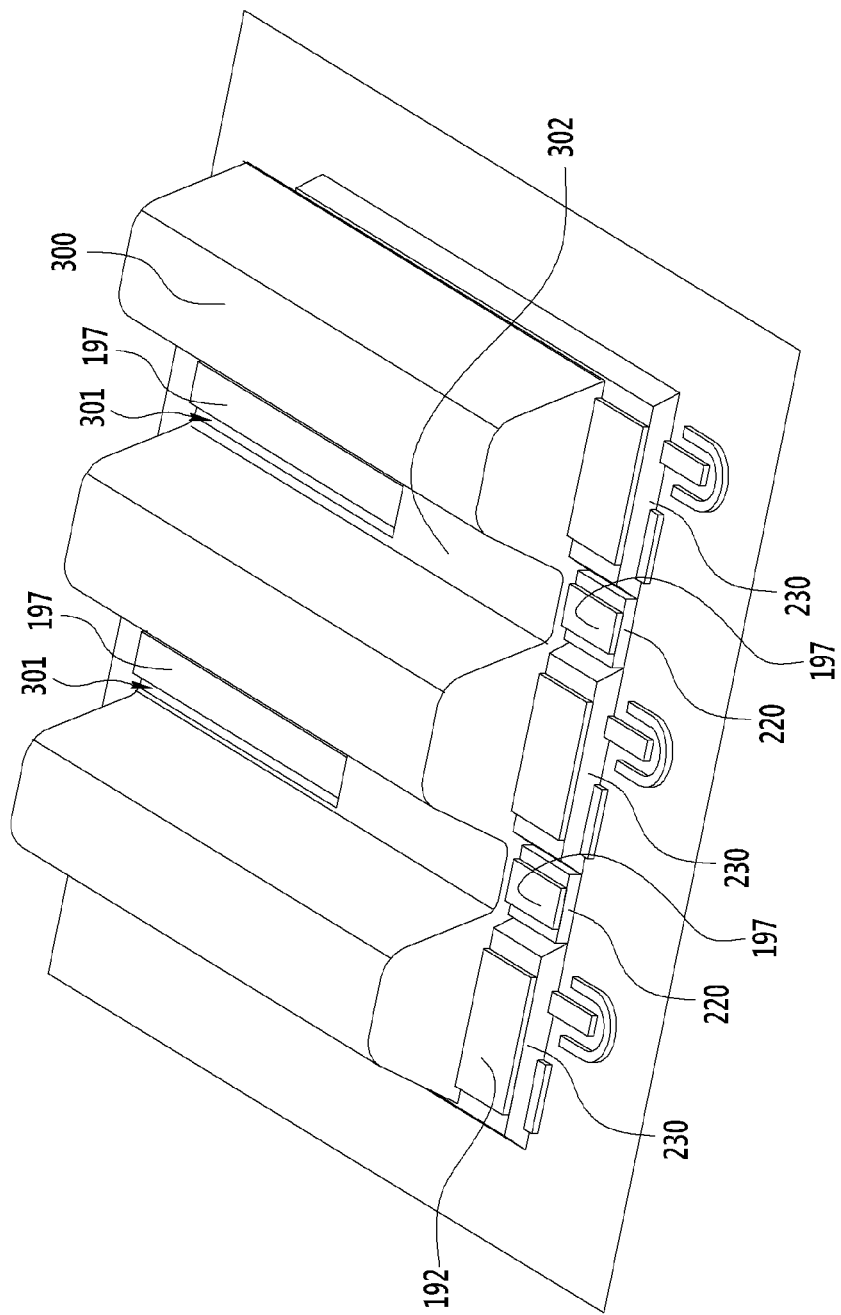

Thereafter, as shown in FIGS. 8A and 8B, a sacrificial layer 300 having an opening 301 and a connection part 302 is formed. The sacrificial layer 300 may include an organic material such as a photo resist ("PR"), but is not limited thereto or thereby. The sacrificial layer 300 has the opening 301, and the connection part 302 which is positioned between a main body corresponding to a structure of a microcavity and an adjacent main body corresponding to an adjacent microcavity.

The opening 301 and the connection part 302 are formed on the voltage auxiliary wiring 197. The opening 301 exposes the voltage auxiliary wiring 197, and the connection part 302 covers the voltage auxiliary wiring 197 to protect a portion of the voltage auxiliary wiring 197 in a subsequent forming process of the liquid crystal injection hole 335. That is, the connection part 302 is formed at a position corresponding to a region (hereinafter, referred to as a 'liquid crystal injection hole open region') which is subsequently etched in a forming process of the liquid crystal injection hole 335.

The opening 301 and the connection part 302 have a longitudinal axis and a width is taken perpendicular to the longitudinal axis. In an exemplary embodiment, a width of the opening 301 and/or connection part 302 may be about 2.5 µm.

In FIG. 8B, a thickness of the connection part 302 taken perpendicular to the insulation substrate 110 is smaller than a thickness of the main body of the sacrificial layer 300, but is not limited thereto or thereby. In an exemplary embodiment, the connection part 302 may have a thickness substantially the same as the thickness of the main body of the sacrificial layer 300.

Further, FIG. 8B illustrates a region (a lower portion of the drawing) where the pixel electrode 192 and the thin film transistor are exposed. This region is shown intentionally exposed in order to clearly show a structure of the lower layer, but actually, the corresponding portion is covered by the sacrificial layer 300 in the manufacturing process. This is the same in FIGS. 9B, 10B, 11B, 12B, 13 and 14.

Figure 9B:
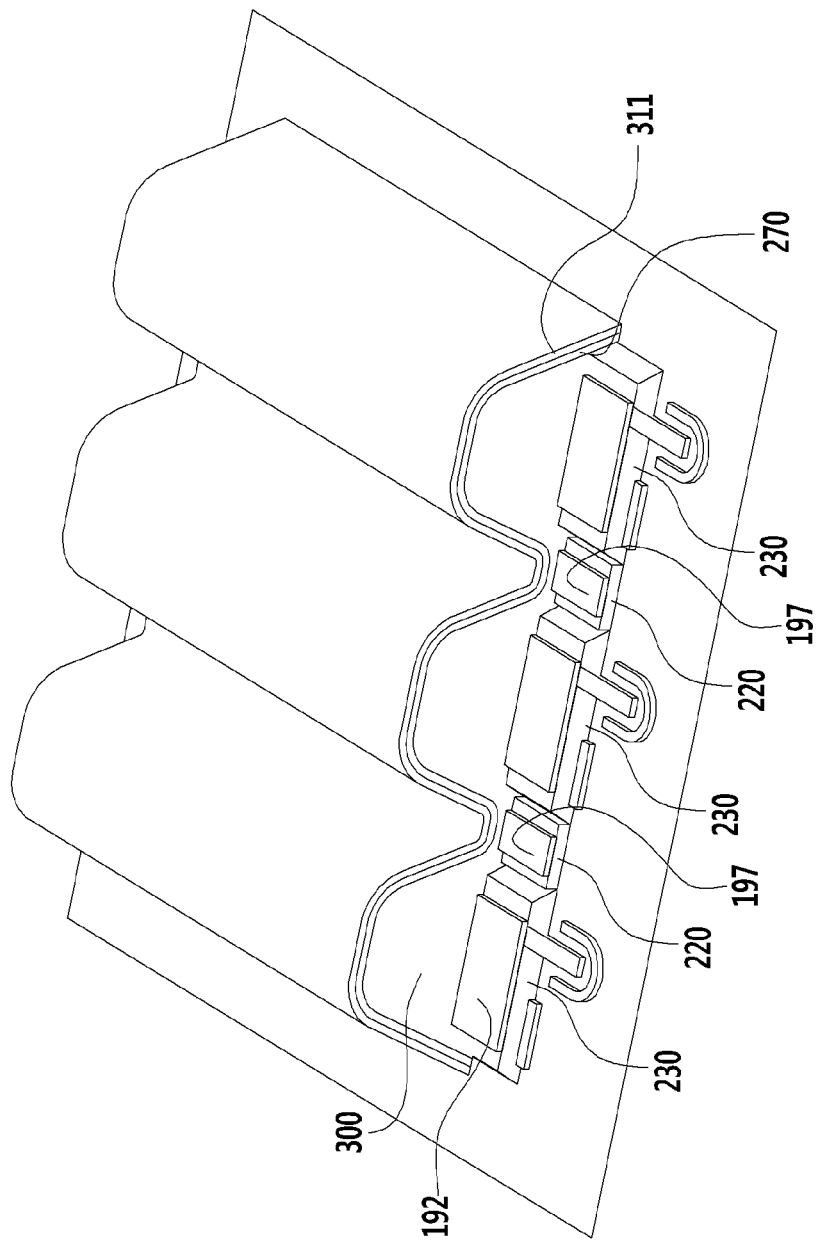

Thereafter, as shown in FIGS. 9A and 9B, the common electrode 270 and the lower insulating layer 311 are formed in sequence. That is, a transparent conductive material such as ITO or IZO is laminated on an entire region of the display panel, and then a lower insulating layer forming material including an inorganic insulating material such as silicon nitride (SiNx) is laminated on an entire of the region of the display panel. As a result, the common electrode 270 is electrically connected with the voltage auxiliary wiring 197 exposed by the opening 301 of the sacrificial layer 300, and the lower insulating layer 311 is formed to cover the common electrode 270.

Figure 10A:
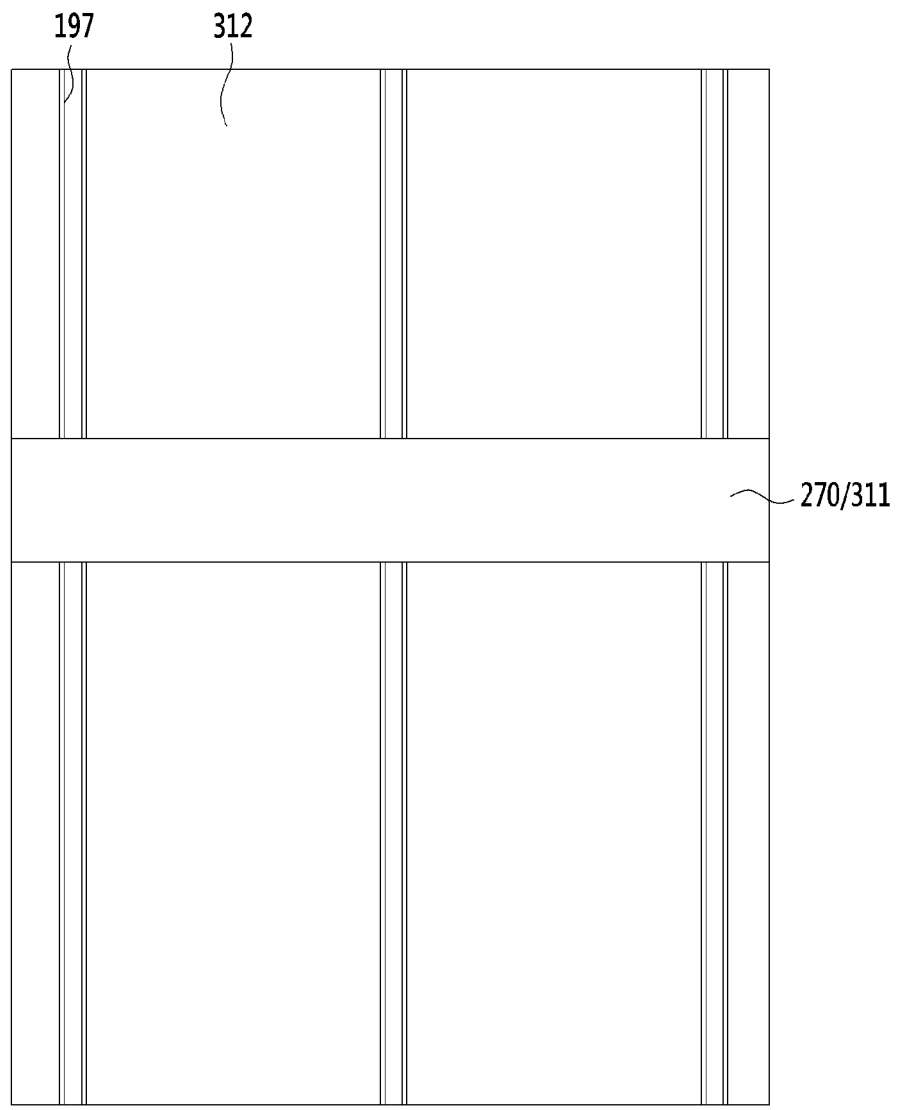

Thereafter, as shown in FIGS. 10A and 10B, a support layer 312 is formed. The support layer 312 may include an organic material, and the support layer 312 is not formed in the liquid crystal injection hole open region. That is, a material for the support layer 312 including the organic material is laminated in the entire region of the panel and exposed and developed by using a mask, and then the support layer 312 is formed by removing the material for the support layer 312 at the region corresponding to the liquid crystal injection hole open region. In this case, the common electrode 270 and the lower insulating layer 311 which are formed below the support layer 312 are not etched and then exposed, which is shown only in FIG. 10A and is not shown in FIG. 10B. This is because the material for the support layer 312 including the liquid crystal injection hole open region is previously removed in order to show a cross section in FIG. 10B. As described above, only the sacrificial layer 300, the connection part 302, the common electrode 270, and the lower insulating layer 311 are formed in the liquid crystal injection hole open region through the forming process of the support layer 312, while the sacrificial layer 300 or opening 301, the common electrode 270, the lower insulating layer 311, the support layer 312, etc. are laminated in other regions excluding the liquid crystal injection hole open region.

Thereafter, as shown in FIGS. 11A, 11B, 12A and 12B, a material for an upper insulating layer 313 including an inorganic insulating material such as silicon nitride (SiNx) is laminated (see FIGS. 11A and 11B), and the liquid crystal injection hole open region is etched (see FIGS. 12A and 12B), thereby forming the upper insulating layer 313 and the liquid crystal injection hole 335. The liquid crystal injection hole 335 may expose an inner area of the microcavity.

In detail, as shown in FIGS. 11A and 11B, the material for the upper insulating layer 313 including an inorganic insulating material such as silicon nitride (SiNx) is laminated all over the region of the display panel. As a result, as shown in FIGS. 11A and 11B, a material for the upper insulating layer 313 is formed even on the support layer 312 and formed even in the liquid crystal injection hole open region where the support layer 312 is not formed, and thus the material for the upper insulating layer 313 is formed on the lower insulating layer 311 of the liquid crystal injection hole open region. In FIG. 11A, reference numerals 270/311/313 illustrate that the common electrode 270, the lower insulating layer 311 and the material 313 for the upper insulating layer are sequentially laminated in the liquid crystal injection hole open region. In FIG. 11B, since the liquid crystal injection hole open region is eliminated and not shown, a structure in which the common electrode 270, the lower insulating layer 311 and the material for the upper insulating layer 313 are sequentially laminated is shown.

Figure 12A:
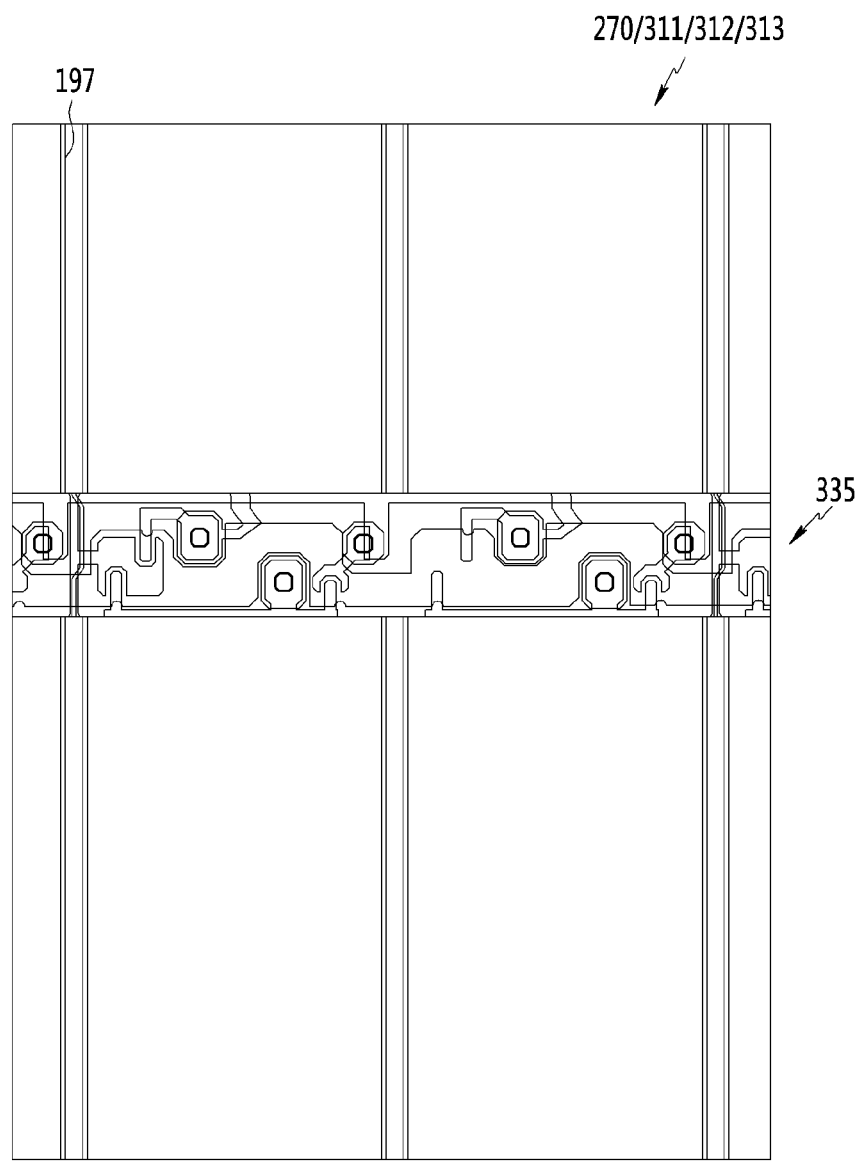

Thereafter, as shown in FIGS. 12A and 12B, a process of etching the liquid crystal injection hole open region is performed. In order to etch the liquid crystal injection hole open region, a photo resist ("PR") is formed in the entire region. The photo resist ("PR") corresponding to the liquid crystal injection hole open region is removed to form a photo resist pattern and then etched according to the photo resist pattern to form the liquid crystal injection hole open region. In this case, in a layer etched in the liquid crystal injection hole open region, the material for the upper insulating layer 313, the lower insulating layer 311, the common electrode 270 and the sacrificial layer 300 (including the connection part 302) are etched, while a layer therebelow is not etched. The sacrificial layer 300 (including the connection part 302) may be partially etched or may not be etched according to an exemplary embodiment. Here, the process of etching the liquid crystal injection hole open region may be performed by dry etching, or may be performed by wet etching in the case of using an etchant capable of etching multiple layers together. The arrows in FIG. 12B represents that the liquid crystal injection hole open region is etched.

Figure 13:
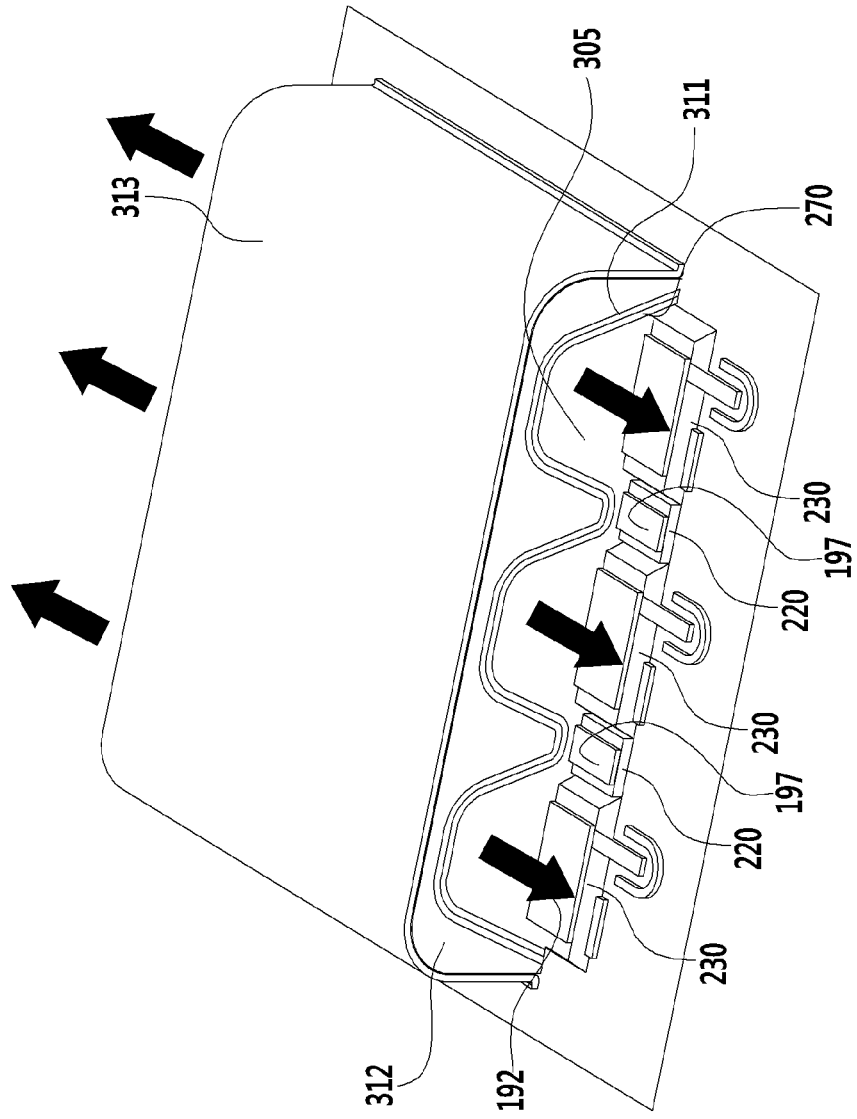

Thereafter, as shown in FIG. 13, a process of removing the sacrificial layer 300 through the liquid crystal injection hole open region is performed. In the exemplary embodiment, since the sacrificial layer 300 is formed by the photo resist ("PR"), a process of removing the photo resist pattern formed on the upper insulating layer 313 may be performed together. That is, the photo resist pattern formed on the upper insulating layer 313 together with the sacrificial layer 300 is immersed in an etchant (for example, a photo resist stripper) for removing the photo resist pattern which is wet-etched. According to the above process, the process of removing the photo resist ("PR") formed on the upper insulating layer 313 and the process of removing the sacrificial layer 300 may be performed together, such that a manufacturing process is shortened.

However, in the case where the sacrificial layer 300 is formed by a material other than the photo resist (PR), the two processes may be separately performed. Further, the sacrificial layer 300 may not be wet-etched but dry-etched, which will be described in detail in an exemplary embodiment of FIG. 18.

Arrow of FIG. 13 illustrates that the liquid crystal injection hole open region is etched and then the sacrificial layer 300 is exposed to remove the exposed sacrificial layer 300, thereby forming the microcavity 305.

Figure 14:
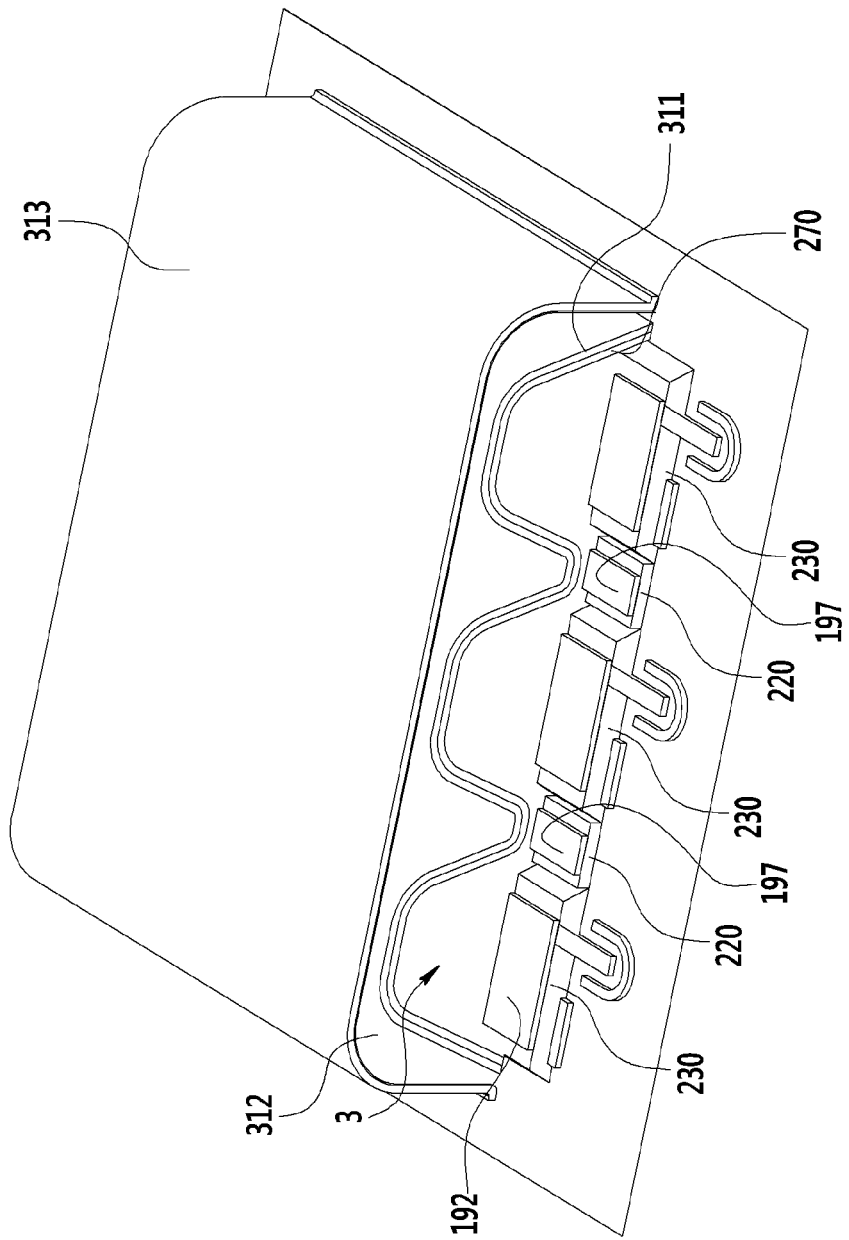

Thereafter, as shown in FIG. 14, a liquid crystal material is injected in the formed microcavity 305 to form the liquid crystal layer 3. The liquid crystal injection hole 335 may be sealed or covered to keep the liquid crystal material in the microcavity 305.

In one exemplary embodiment, an alignment layer which aligns liquid crystal molecules may be first formed in the microcavity 305 before injecting the liquid crystal material, and thereafter, the liquid crystal material may be injected. The alignment layer and the liquid crystal material may be injected in the microcavity 305 by using a capillary force.

In the above exemplary embodiment, a process time is shortened by removing the photo resist ("PR") forming the liquid crystal injection hole open region and the sacrificial layer 300 together, at a same time. Further, the process time is shortened in a subsequent liquid crystal injection hole opening by removing the support layer 312 in the liquid crystal injection hole open region when forming the support layer 312. Further, a mask used when the support layer 312 of the liquid crystal injection hole open region is removed in FIGS. 11A and 11B and a mask used when the photo resist ("PR") is formed in order to etch the liquid crystal injection hole open region in FIGS. 12A and 12B, may be the same as each other.

In addition, unlike the above exemplary embodiment, the support layer 312 corresponding to the liquid crystal injection hole open region may not be removed when the support layer 312 is formed, and in this case, as shown in FIGS. 12A and 12B, when the liquid crystal injection hole open region is etched, the support layer 312 corresponding to the liquid crystal injection hole open region may also be formed together, at a same time.

The lower insulating layer 311 and the upper insulating layer 313 may be omitted according to an exemplary embodiment.

Further, a process of attaching a polarizer (not shown) below the insulation substrate 110 and above the upper insulating layer 313 may be further included. The polarizer includes a polarization element generating polarization and a tri-acetyl-cellulose ("TAC") layer for ensuring durability. Directions of transmissive axes in an upper polarizer and a lower polarizer may be vertical (e.g., perpendicular) or parallel to each other according to an exemplary embodiment.

In the above exemplary embodiment, when the sacrificial layer 300 is formed, the connection part 302 is formed and thus the voltage auxiliary wiring 197 is not etched when the liquid crystal injection hole open region is etched.

This will be described in more detail with reference to FIGS. 15 and 16.

Figure 15:
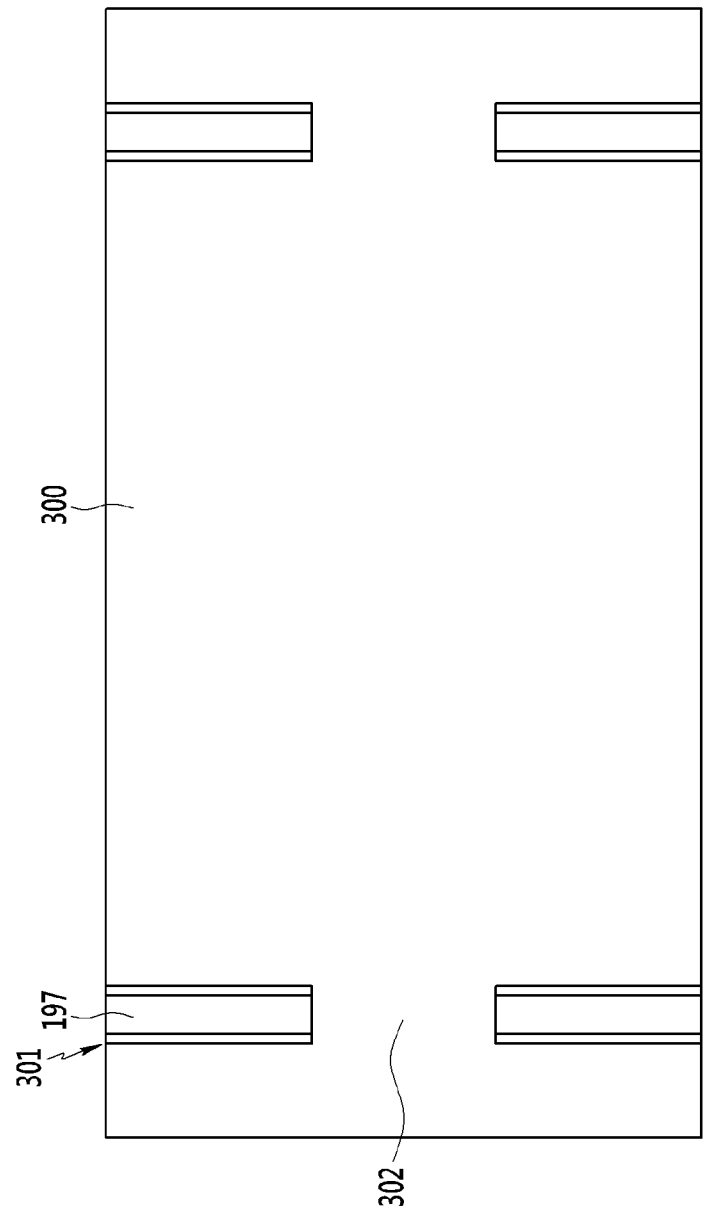
FIGS. 15 and 16 are diagrams respectively illustrating an exemplary embodiment of a structure of a sacrificial layer according to the invention, and an exemplary embodiment of a liquid crystal display panel after etching according to the structure of the sacrificial layer.
Figure 16:
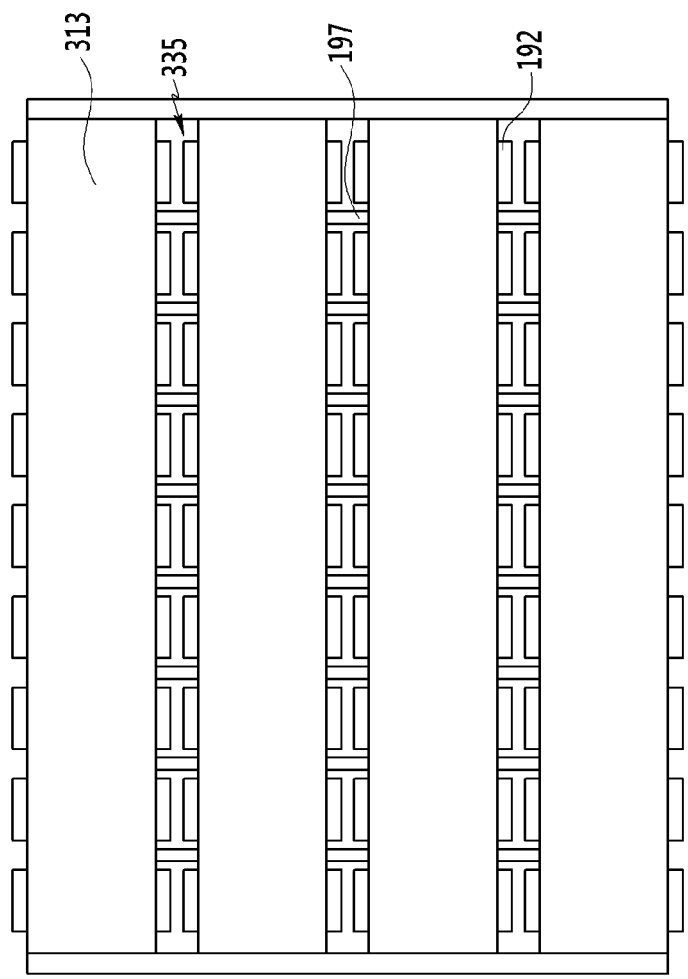

FIGS. 15 and 16 are diagrams illustrating an exemplary embodiment of a structure of a sacrificial layer according to the invention and a liquid crystal display panel after etching according to the structure.

As shown in FIG. 15, the sacrificial layer 300 includes the opening 301 and the connection part 302. The connection part 302 is formed to connect main bodies of the sacrificial layer 300 and corresponds to the liquid crystal injection hole open region. The openings 301 which are vertically connected to each other by the connection part 302 are horizontally separated from each other. The voltage auxiliary wiring 197 is exposed by the opening 301, and covered by the connection part 302 in the liquid crystal injection hole open region.

Thereafter, referring to FIG. 16, when the liquid crystal injection hole open region is etched, the liquid crystal panel has a structure in which the liquid crystal injection hole 335 and the upper insulating layer 313 each have a longitudinal axis which extends in an extending direction (e.g., horizontal direction in the plan view of FIG. 16) of the gate line 121, and the pixel electrode 192 and the voltage auxiliary wiring 197 are exposed by the etched liquid crystal injection hole open region. According to an exemplary embodiment, an exposure of the pixel electrode 192 may be varied by controlling a width of the liquid crystal injection hole open region taken perpendicular to the longitudinal axis. The width of the liquid crystal injection hole open region varies according to an exemplary embodiment, and at least a part of the sacrificial layer 300 needs to exposes the liquid crystal injection hole open region so that the liquid crystal injection hole 335 is formed.

As shown in FIG. 16, since the voltage auxiliary wiring 197 is not etched by the above-described forming process, a common voltage is transferred in a direction parallel to the data line 171 through the voltage auxiliary wiring 197, and thus although a position of the common electrode 270 is changed in the direction parallel to the data line 171, the common electrode 270 may have constant common voltage applied thereto.

Figure 17:
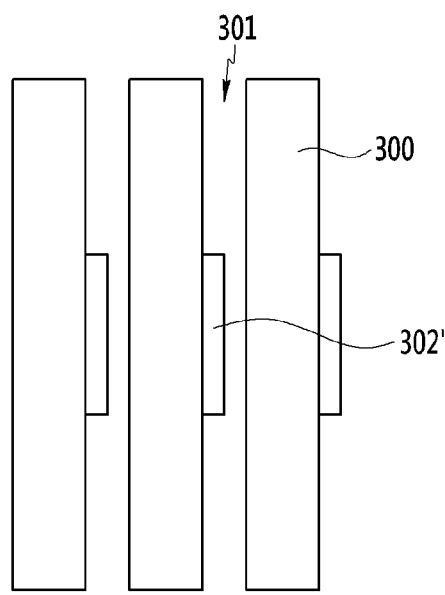
FIG. 17 is a diagram illustrating a structure of another exemplary embodiment of a sacrificial layer according to the invention.

In FIG. 17, a plan view of another exemplary embodiment of a sacrificial layer 300 according to the invention is shown.

FIG. 17 is a diagram illustrating a structure of another exemplary embodiment of a sacrificial layer according to the invention.

Unlike the sacrificial layer 300 of FIG. 15, in a structure of the sacrificial layer 300 of FIG. 17, a connection part 302' does not connect adjacent main bodies of the sacrificial layer 300. Instead, the connection part 302' is connected to a main body of the sacrificial layer 300 at a first side of the connection part 302', and is separated from an adjacent main body of the sacrificial layer 300 at an opposing second side thereof. As a result, the opening 301 is continuous and integrally connected along an extending direction of the data line 171 (e.g., vertically in FIG. 17).

The connection part 302' of the sacrificial layer 300 according to the exemplary embodiment of FIG. 17 is formed to overlap a portion of the lower voltage auxiliary wiring 197, for example, in the horizontal direction. In comparison, FIG. 15 shows the connection part 302 overlapping an entire of a width of the voltage auxiliary wiring 197 in the horizontal direction. The overlapping area of the connection part 302' and the voltage auxiliary wiring 197 is sufficient such that the voltage auxiliary wiring 197 is not disconnected although the liquid crystal injection hole open region is etched. Accordingly, since the voltage auxiliary wiring 197 remains substantially continuous (e.g., not disconnected) the common voltage is transferred even in a direction parallel to the data line 171, although a position of the common electrode 270 is changed in the direction parallel to the data line 171, the common electrode 270 may have constant common voltage applied thereto.

According to still another exemplary embodiment, when the liquid crystal injection hole open region is etched, although the connection parts 302 and 302' do not exist in the sacrificial layer 300, the voltage auxiliary wiring 197 may not be etched by controlling a process condition.

Hereinafter, another exemplary embodiment of a liquid crystal display according to the invention will be described with reference to FIG. 18.

Figure 18:
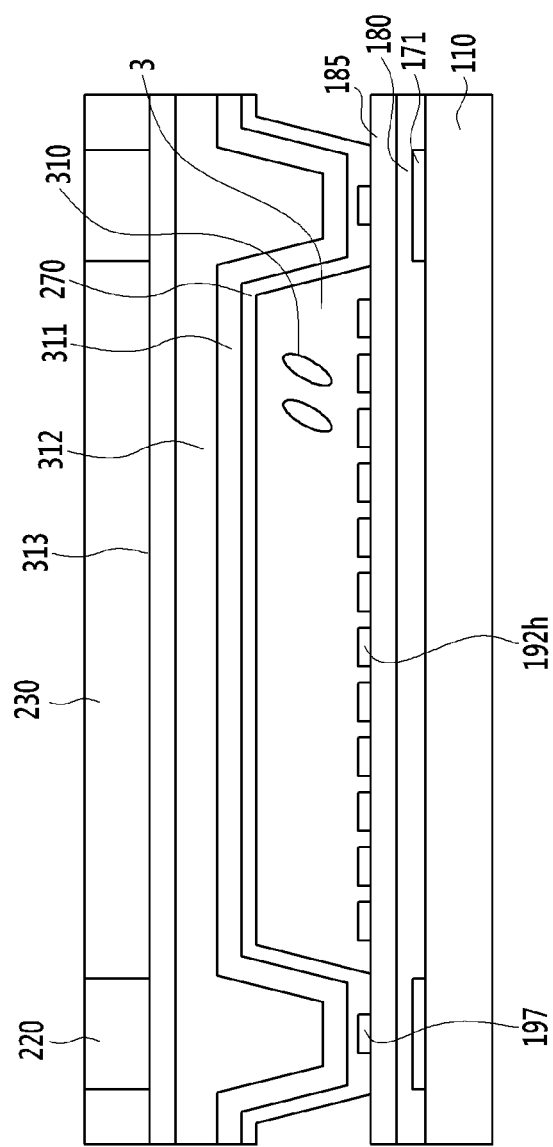
FIG. 18 is a cross-sectional view of another exemplary embodiment of a liquid crystal display according to the invention.

FIG. 18 is a cross-sectional view of another exemplary embodiment of a liquid crystal display according to the invention.

FIG. 18 corresponds to FIG. 2, and unlike FIG. 2, the color filter 230 and the light blocking member 220 are positioned above the upper insulating layer 313. In an alternative exemplary embodiment, the position of the color filter 230 and the light blocking member 220 may be formed on a separate additional insulation substrate unlike FIGS. 2 and 18, and may be variously formed.

The structure of FIG. 18 may have the following differences in a manufacturing method unlike the structure of FIG. 2.

That is, when forming the color filter 230 or forming the light blocking member 220 including an organic material, a bake process of a material is required. The bake process means that the material is deposited and then exposed at or greater than a predetermined temperature so as to firmly harden the material.

In the exemplary embodiment of FIG. 2, the wet-etching is performed in order to remove the sacrificial layer 300, but in the case where the color filter 230 is formed after the sacrificial layer 300 is formed, the sacrificial layer 300 is hardened and thus it is difficult to perform the wet-etching. Accordingly, to use the wet-etching, the color filter 230 or the light blocking member 220 may be formed before the sacrificial layer 300 is formed or the color filter 230 or the light blocking member 220 may be formed after the sacrificial layer 300 is removed.

However, in the case where the sacrificial layer 300 is dry-etched, it does not matter that the sacrificial layer 300 is hardened. Therefore, in the exemplary embodiment of FIG. 18, the sacrificial layer 300, the common electrode 270, the lower insulating layer 311, the support layer 312 and the upper insulating layer 313 are formed, and the light blocking member 220 and the color filter 230 are formed thereon, and then a bake process of hardening the layered structure is performed. Since the sacrificial layer 300 and the like are hardened by the bake process and thus the wet-etching may not be easy, the dry-etching is performed. Particularly, even when the sacrificial layer 300 is removed through the liquid crystal injection hole 335, a dry-etching such as sputtering is performed.

Widely, although the forming of the color filter 230 (including the bake process) is performed between the forming of the common electrode 270 and the etching of the liquid crystal injection hole open region in order to form the liquid crystal injection hole 335, there is no problem in the case where the sacrificial layer 300 is removed by dry-etching.

In the above exemplary embodiment, the sacrificial layer 300 is fully removed, but a part of the sacrificial layer 300 (for example, regions which are not exposed although the liquid crystal injection hole open region is etched by the connection part 302) may remain.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
   an insulation substrate;
   pixel electrodes on the insulation substrate;
   a voltage auxiliary wiring on the insulation substrate and between adjacent pixel electrodes, wherein the voltage auxiliary wiring is exposed between adjacent microcavities; and
   a common electrode which overlaps the liquid crystal layer and the exposed voltage auxiliary wiring,
   wherein each of the microcavities comprises a liquid crystal layer.

2. The liquid crystal display of claim 1,
   further comprising a plurality of common electrodes,
   wherein the plurality of common electrodes extends in a first direction and are arranged at intervals in a second direction perpendicular to the first direction.

3. The liquid crystal display of claim 2, wherein:
   the voltage auxiliary wiring extends in the second direction.

4. The liquid crystal display of claim 3,
   further comprising a data line on the insulation substrate,
   wherein the voltage auxiliary wiring is between the data line and the common electrodes.

5. The liquid crystal display of claim 4, wherein:
a width of the voltage auxiliary wiring is smaller than a width of the data line.

6. The liquid crystal display of claim 4,
further comprising a thin film transistor on the insulation substrate,
wherein the voltage auxiliary wiring and the data line are separated from each other in a region of the thin film transistor.

7. The liquid crystal display of claim 6, wherein:
the voltage auxiliary wiring is bent in the region of the thin film transistor.

8. The liquid crystal display of claim 1, wherein:
the pixel electrodes and the voltage auxiliary wiring comprise a same material.

9. The liquid crystal display of claim 1, wherein:
the pixel electrodes comprise minute branches.

10. The liquid crystal display of claim 1,
further comprising a color filter,
wherein the color filter is between the insulation substrate and the pixel electrodes.

11. The liquid crystal display of claim 1,
further comprising a color filter,
wherein the liquid crystal layer is between the insulation substrate and the color filter.

12. The liquid crystal display of claim 1, wherein:
the voltage auxiliary wiring and the common electrode are electrically connected each other.

13. A manufacturing method of a liquid crystal display, the method comprising:
forming a pixel electrode and a voltage auxiliary wiring on a substrate;
forming a sacrificial layer on the pixel electrode and the voltage auxiliary wiring, wherein the sacrificial layer exposes a portion of the voltage auxiliary wiring;
forming a common electrode on the sacrificial layer and electrically connected to the voltage auxiliary wiring;
forming a liquid crystal injection hole by removing the sacrificial layer of a liquid crystal injection hole open region;
forming a microcavity by removing the sacrificial layer below the common electrode, through the liquid crystal injection hole; and
providing a liquid crystal material into the microcavity.

14. The manufacturing method of a liquid crystal display of claim 13, wherein:
the sacrificial layer comprises a main body extended in a first direction, and a connection part protruding from the main body.

15. The manufacturing method of a liquid crystal display of claim 14, wherein:
the connecting part overlaps the portion of the voltage auxiliary wiring.

16. The manufacturing method of a liquid crystal display of claim 14, wherein:
the connecting part of the sacrificial layer is in the liquid crystal injection hole open region, and is etched in the forming a liquid crystal injection hole by removing the sacrificial layer, to expose the portion of the voltage auxiliary wiring.

17. The manufacturing method of a liquid crystal display of claim 14, wherein:
in the forming a liquid crystal injection hole,
a photo resist is formed in the liquid crystal injection hole open region,
a photo resist pattern is formed by removing the photo resist of the liquid crystal injection hole open region, and
etching is performed based on the formed photo resist pattern.

18. The manufacturing method of a liquid crystal display of claim 17, wherein:
the sacrificial layer comprises the photo resist.

19. The manufacturing method of a liquid crystal display of claim 18, wherein:
in the forming a microcavity by removing the sacrificial layer below the common electrode,
the sacrificial layer comprising the photo resist material and the photo resist pattern are wet-etched together.

20. The manufacturing method of a liquid crystal display of claim 14, further comprising:
after the forming a common electrode on the sacrificial layer and before the forming a liquid crystal injection hole by removing the sacrificial layer,
forming a lower insulating layer on the common electrode;
forming a support layer on the lower insulating layer; and
forming an upper insulating layer on the support layer.

21. The manufacturing method of a liquid crystal display of claim 20, wherein:
in the forming a common electrode and the forming a lower insulating layer, the common electrode and the lower insulating layer are formed on an entire of the insulation substrate.

22. The manufacturing method of a liquid crystal display of claim 21, wherein:
in the forming a support layer,
a material for the support layer is formed on the entire of the insulation substrate, and
the material for the support layer formed in the liquid crystal injection hole open region is removed.

23. The manufacturing method of a liquid crystal display of claim 22, wherein:
in the forming a liquid crystal injection hole by removing the sacrificial layer of the liquid crystal injection hole open region, a photo resist pattern is formed on the upper insulating layer to etch the liquid crystal injection hole open region, and
in the forming a microcavity by removing the sacrificial layer below the common electrode, the sacrificial layer comprising the photo resist material and the photo resist pattern remaining on the upper insulating layer, are wet-etched together.

24. The manufacturing method of a liquid crystal display of claim 14, further comprising:
forming a color filter between the forming a common electrode and the forming a liquid crystal injection hole,
wherein the forming a color filter is performed by a bake process.

25. The manufacturing method of a liquid crystal display of claim 24, wherein:
in the forming a microcavity by removing the sacrificial layer, a dry-etching is performed to remove the sacrificial layer.

26. The manufacturing method of a liquid crystal display of claim 13, wherein:
in the forming the pixel electrode and the voltage auxiliary wiring, the pixel electrode and the voltage auxiliary wiring are formed together.

* * * * *